US012627827B2

(12) United States Patent
Wang et al.

(10) Patent No.: US 12,627,827 B2
(45) Date of Patent: May 12, 2026

(54) TEMPLATE BASED PREDICTION

(71) Applicant: Tencent America LLC, Palo Alto, CA (US)

(72) Inventors: Biao Wang, San Jose, CA (US); Madhu Peringassery Krishnan, Mountain View, CA (US); Lien-Fei Chen, Hsinchu (TW); Roman Chernyak, Santa Clara, CA (US); Xin Zhao, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 18/769,339

(22) Filed: Jul. 10, 2024

(65) Prior Publication Data

US 2025/0024063 A1 Jan. 16, 2025

Related U.S. Application Data

(60) Provisional application No. 63/526,175, filed on Jul. 11, 2023.

(51) Int. Cl.
| | |
|---|---|
| *H04N 19/50* | (2014.01) |
| *H04N 19/105* | (2014.01) |
| *H04N 19/117* | (2014.01) |
| *H04N 19/132* | (2014.01) |

(Continued)

(52) U.S. Cl.
CPC ........... *H04N 19/50* (2014.11); *H04N 19/105* (2014.11); *H04N 19/117* (2014.11);

(Continued)

(58) Field of Classification Search
CPC .... H04N 19/50; H04N 19/105; H04N 19/117; H04N 19/132; H04N 19/172; H04N 19/176; H04N 19/70; H04N 19/80

(Continued)

(56) References Cited

U.S. PATENT DOCUMENTS

| | | | |
|---|---|---|---|
| 2021/0297688 A1* | 9/2021 | Xu ........................ | H04N 19/159 |
| 2021/0352277 A1* | 11/2021 | Filippov .............. | H04N 19/167 |

(Continued)

OTHER PUBLICATIONS

International Search Report and Written Opinion received for PCT Patent Application No. PCT/US2024/037661, mailed on Oct. 1, 2024, 9 pages.

(Continued)

*Primary Examiner* — Jayanti K Patel
*Assistant Examiner* — Richard B Carter
(74) *Attorney, Agent, or Firm* — ArentFox Schiff LLP

(57) ABSTRACT

Aspects of the disclosure includes methods and apparatuses for video decoding and video encoding and a method of processing visual media data. Coded information in a bitstream is received. The coded information indicates whether filtering is to be applied to at least one of a current template of a current block in a current picture and a reference template of a reference block. The current block is predicted based on the reference block. When the coded information indicates that the filtering is to be applied, a plurality of samples in the at least one of the current template and the reference template is filtered. A linear model between the current template and the reference template is determined based on the filtered plurality of samples. The current block is reconstructed based on the linear model and the reference block.

20 Claims, 13 Drawing Sheets

(51) Int. Cl.

| | |
|---|---|
| *H04N 19/172* | (2014.01) |
| *H04N 19/176* | (2014.01) |
| *H04N 19/70* | (2014.01) |
| *H04N 19/80* | (2014.01) |

(52) U.S. Cl.
CPC ......... *H04N 19/132* (2014.11); *H04N 19/172* (2014.11); *H04N 19/176* (2014.11); *H04N 19/70* (2014.11); *H04N 19/80* (2014.11)

(58) Field of Classification Search
USPC ................................................... 375/240.13
See application file for complete search history.

(56) References Cited

U.S. PATENT DOCUMENTS

| | | |
|---|---|---|
| 2023/0009360 A1 | 1/2023 | Mora et al. |
| 2024/0236314 A1* | 7/2024 | Wang .................. H04N 19/105 |
| 2025/0008086 A1* | 1/2025 | Yang ..................... H04N 19/82 |

OTHER PUBLICATIONS

Zhou et al., "Non-EE2: DIMD with filtered template", Joint Video Experts Team (JVET) of ITU-T SG16 WP3/16 and ISO/IEC JTC 1/SC 29/WG 11, 31st Meeting: Geneva, CH, Jul. 11-19, 2023, No. JVET-AE0130-v0, Jul. 4, 2023, 3 pages.
Coban et al., "Algorithm description of Enhanced Compression Model 9 (ECM 9)", Joint Video Experts Team (JVET) of ITU-T SG 16 WP 3 and ISO/IEC JTC 1/SC 29, 30th Meeting, Antalya, TR, Apr. 21-28, 2023, No. JVET-AD2025, Jul. 3, 2023, 77 pages.

* cited by examiner

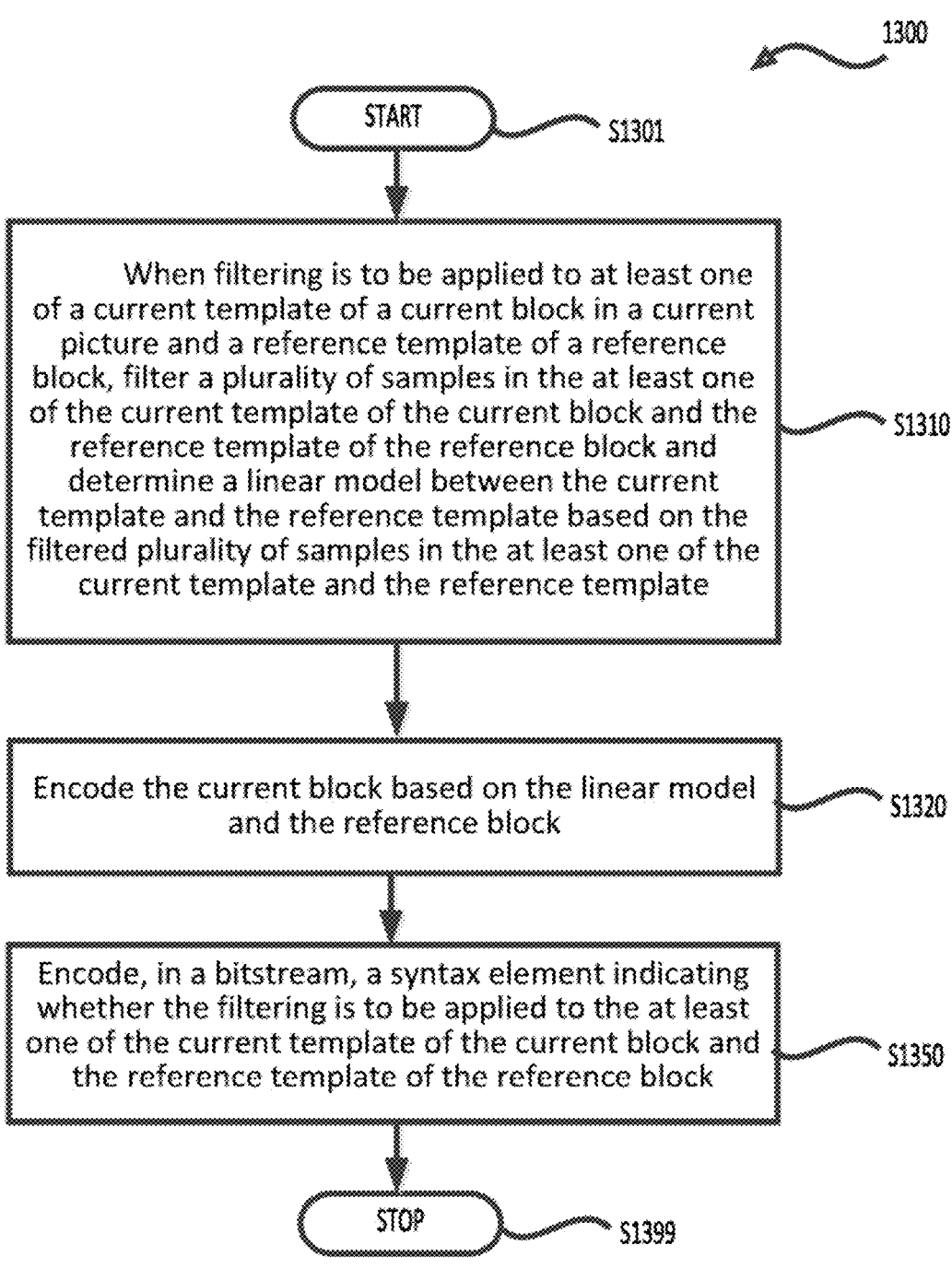

1300

START — S1301

When filtering is to be applied to at least one of a current template of a current block in a current picture and a reference template of a reference block, filter a plurality of samples in the at least one of the current template of the current block and the reference template of the reference block and determine a linear model between the current template and the reference template based on the filtered plurality of samples in the at least one of the current template and the reference template — S1310

Encode the current block based on the linear model and the reference block — S1320

Encode, in a bitstream, a syntax element indicating whether the filtering is to be applied to the at least one of the current template of the current block and the reference template of the reference block — S1350

STOP — S1399

FIG. 13

TEMPLATE BASED PREDICTION

RELATED APPLICATION

The present application claims the benefit of priority to U.S. Provisional Application No. 63/526,175, "METHOD AND APPARATUS FOR IMPROVEMENT ON TEMPLATE BASED PREDICTION" filed on Jul. 11, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding.

According to an aspect of the disclosure, a method for video decoding includes receiving coded information in a bitstream. The coded information indicates whether filtering is to be applied to at least one of a current template of a current block in a current picture and a reference template of a reference block. The current block is predicted based on the reference block of the current block. When the coded information indicates that the filtering is to be applied to the at least one of the current template of the current block and the reference template of the reference block, the method includes filtering a plurality of samples in the at least one of the current template of the current block and the reference template of the reference block and determining a linear model between the current template and the reference template based on the filtered plurality of samples in the at least one of the current template and the reference template. The method includes reconstructing the current block based on the linear model and the reference block.

In an example, the reference block is in the current picture when the current block is predicted according to an intra template matching prediction (IntraTMP) mode.

In an example, the reference block is in a reference picture that is different from the current picture when the current block is predicted according to an inter prediction method.

The current template includes neighboring reconstructed samples of the current block. The reference template includes neighboring reconstructed samples of the reference block.

In an example, the method includes applying the linear model to the reference block to determine a prediction signal and reconstructs the current block based on the prediction signal. When the reference block is in the current picture, a value of a sample in the prediction signal is a weighted sum of the sample in the reference block, a plurality of neighboring samples of the sample in the reference block, and a bias term according to the linear model. When the reference block is in the reference picture, the value of the sample in the prediction signal is a weighted sum of the sample in the reference block and the bias term according to the linear model.

In an example, the at least one of the current template and the reference template includes the current template and the reference template.

In an example, the method includes filtering first samples of the plurality of samples in the current template of the current block with a first filter and filters second samples of the plurality of samples in the reference template of the reference block with a second filter that is different from the first filter.

In an example, the at least one of the current template and the reference template consists of the current template or the reference template.

In an example, the method includes filtering the plurality of samples in the at least one of the current template of the current block and the reference template of the reference block using a filter that is $$\begin{bmatrix} -1 & -1 & -1 \\ -1 & 10 & -1 \\ -1 & -1 & -1 \end{bmatrix}.$$

In an example, the coded information in the bitstream includes a flag indicating whether the filtering is to be applied to the at least one of the current template of the current block and the reference template of the reference block, and the flag is signaled at a block level or a high-level that is higher than the block level.

In an example, the filtering is applied to the at least one of the current template and the reference template only when the current block is a luma block.

In an example, the current block is a luma block or a chroma block.

In an example, the current template includes one of: (i) a top template that is directly above the current block, a left template that is to the left of the current block, and a top-left corner template between the top template and the left template, and (ii) the top template, the left template, the top-left corner template between the top template and the left template, a top-right template that is above and to the right of the current block, and a bottom-left template that is below and to the left of the current block. The reference template has a same shape and a same size as the current template.

In an example, the plurality of samples is a subset of samples in the at least one of the current template of the current block and the reference template of the reference block.

In an example, a filter shape used in the filtering depends on at least one of a location of the current template, a location of the reference template, a size of the current block, a shape of the current block, a size of the current template, and a shape of the current template.

In an aspect, a method for video encoding includes when filtering is to be applied to at least one of a current template of a current block in a current picture and a reference template of a reference block, filtering a plurality of samples in the at least one of the current template of the current block and the reference template of the reference block and determining a linear model between the current template and the reference template based on the filtered plurality of samples in the at least one of the current template and the reference template. The method for video encoding includes encoding the current block based on the linear model and the reference block and encoding, in a bitstream, a syntax element indicating whether the filtering is to be applied to the at least one of the current template of the current block and the reference template of the reference block.

In an example, the reference block is in the current picture when the current block is encoded according to an intra template matching prediction (IntraTMP) mode. The reference block is in a reference picture that is different from the current picture when the current block is encoded according to an inter prediction mode. The current template includes neighboring samples of the current block and the reference template includes neighboring samples of the reference block.

In an example, the at least one of the current template and the reference template includes the current template and the reference template.

In an example, the method includes filtering first samples of the plurality of samples in the current template of the current block with a first filter and filtering second samples of the plurality of samples in the reference template of the reference block with a second filter that is different from the first filter.

In an example, the at least one of the current template and the reference template consists of the current template or the reference template.

In an example, the syntax element is a flag indicating whether the filtering is to be applied to the at least one of the current template of the current block and the reference template of the reference block, and the flag is signaled at a block level or a high-level that is higher than the block level In an aspect, a method of processing visual media data includes processing a bitstream of the visual media data according to a format rule. The bitstream includes a syntax element indicating whether filtering is to be applied to at least one of a current template of a current block in a current picture and a reference template of a reference block, the current block being predicted based on the reference block of the current block. The format rule specifics that when the coded information indicates that the filtering is to be applied to the at least one of the current template of the current block and the reference template of the reference block, a plurality of samples in the at least one of the current template of the current block and the reference template of the reference block is filtered and a linear model between the current template and the reference template is determined based on the filtered plurality of samples in the at least one of the current template and the reference template. The format rule specifies that the current block is reconstructed based on the linear model and the reference block.

Aspects of the disclosure also provide an apparatus for video encoding. The apparatus for video encoding including processing circuitry configured to implement any of the described methods for video encoding.

Aspects of the disclosure also provide an apparatus for video decoding. The apparatus for video decoding including processing circuitry configured to implement any of the described methods for video encoding.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 13 shows a flow chart outlining an encoding process according to some aspects of the disclosure.

DETAILED DESCRIPTION

Figure 1:
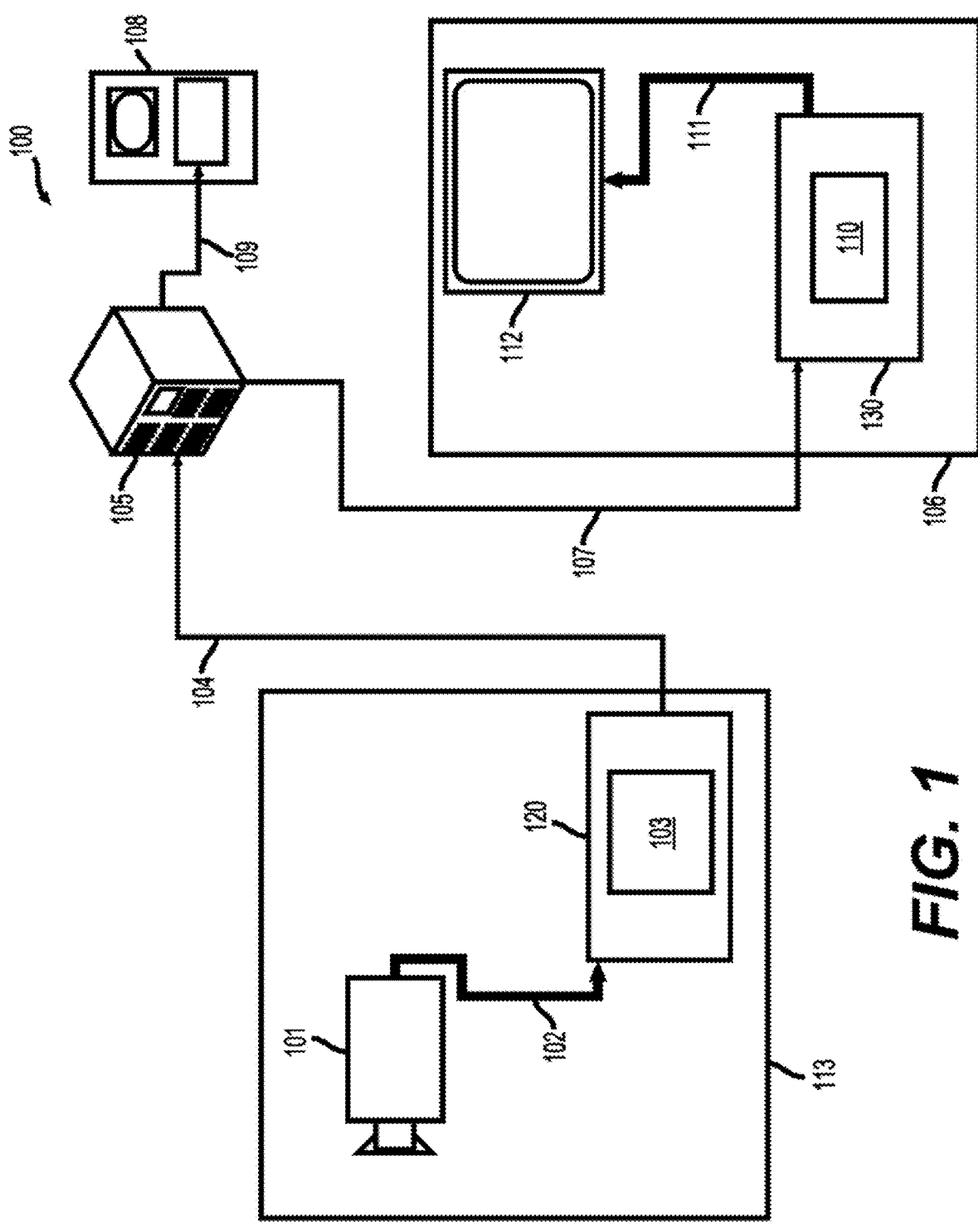
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
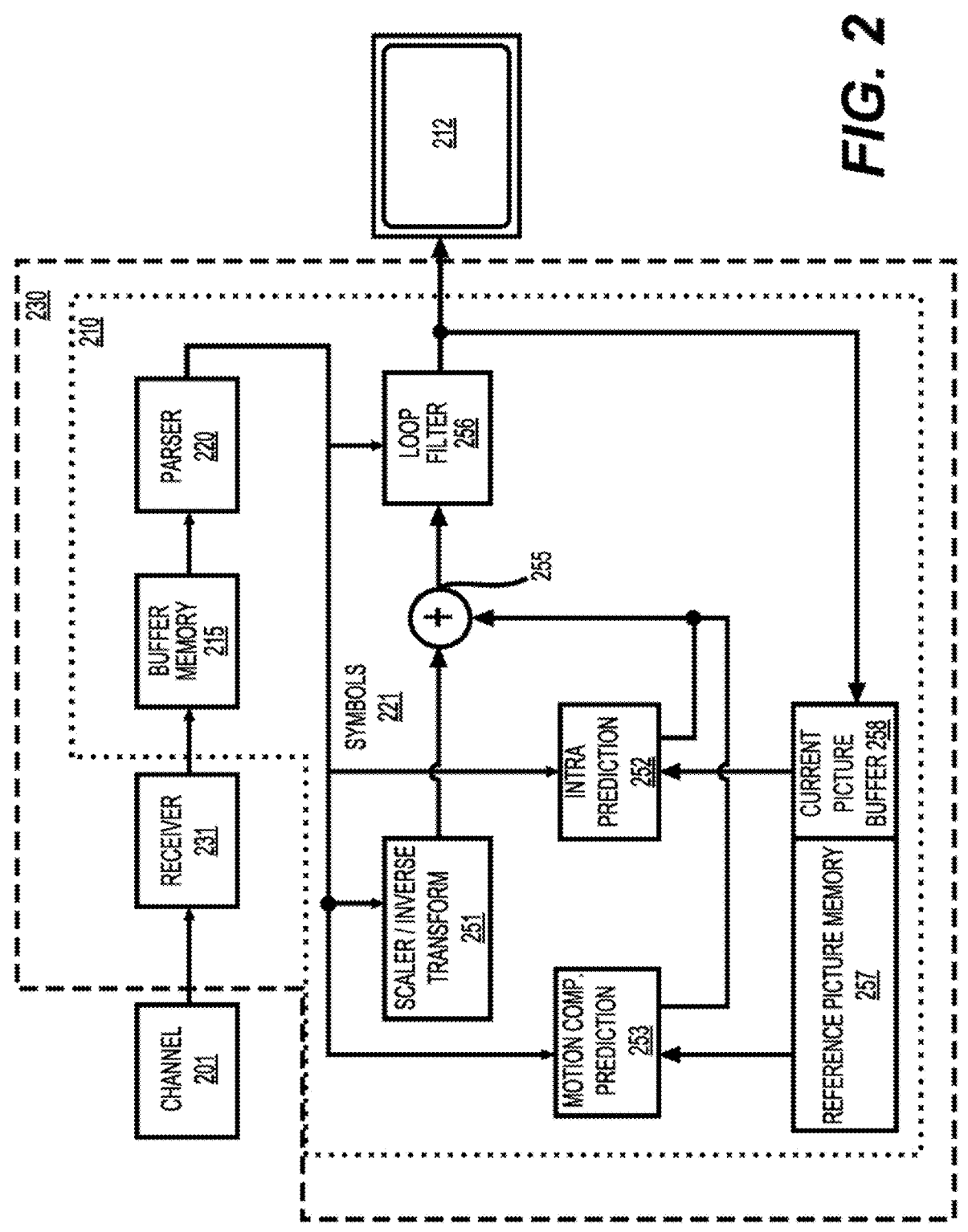
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
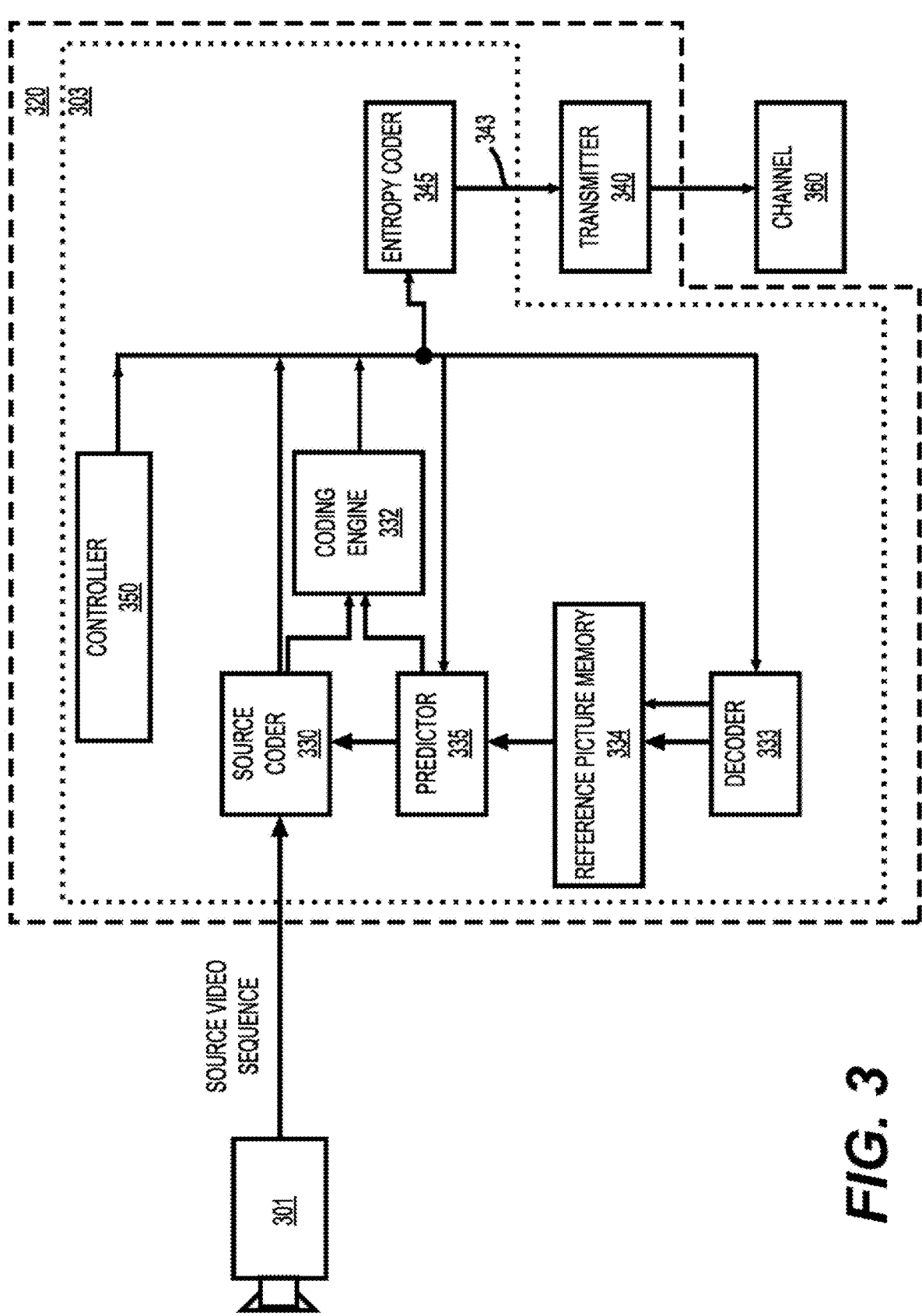
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can include one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may include temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16

CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Aspects of the disclosure describe template-based prediction methods including improvements to template-based prediction methods. A set of methods for video and/or image compression including intra prediction mode coding and inter prediction mode coding is described in the disclosure.

Video coding has been widely used in many applications. Various video coding standards such as H264, H265, H266 (or VVC), AV 1, and AVS have been widely adopted. In an aspect, a video codec may include multiple modules, including intra/inter prediction, transform coding, quantization, entropy coding, in loop filtering, and the like. Intra prediction may be one of the main modules, and may include signaling processing methods (e.g., signaling processing methods) and neural network-based methods.

A current coding block (also interchangeably referred to as a current block) and neighboring samples of the current block may share similar texture characteristic(s). A template of the current block may include neighboring samples (e.g., neighboring reconstructed samples) of the current block. The template of the current block may be interchangeably referred to as a current template of the current block. The current template of the current block may be employed to predict the current block or to improve a predicted signal of the current block.

Figure 4:
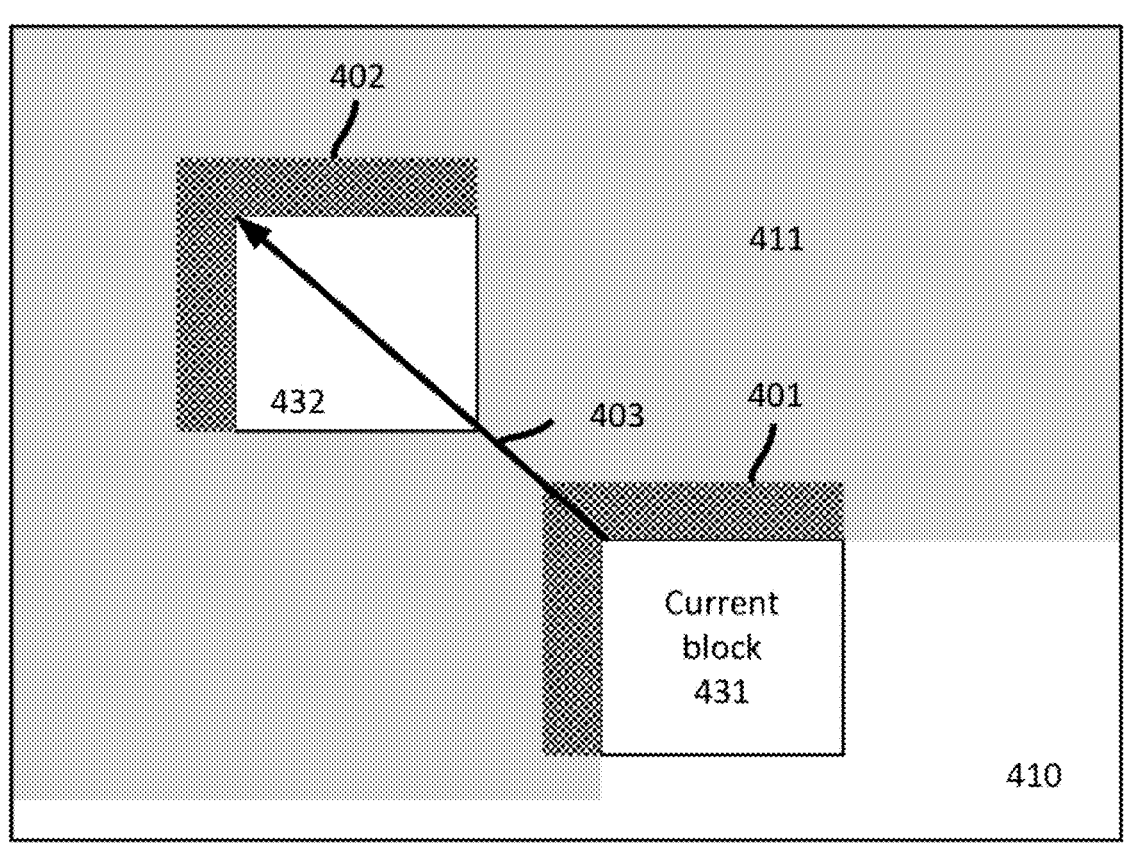
FIG. 4 shows an example of using reconstructed samples in a template to perform intra prediction according to an aspect of the disclosure.

The current template may be used to predict the current block. FIG. 4 shows an example of using reconstructed samples in a template to perform intra prediction according to an aspect of the disclosure. In FIG. 4, a current block (431) in a current picture (also interchangeably referred to as a current frame) (410) is being coded, for example, the current block (431) is under reconstruction. The current picture (410) may include an area (411) (in gray). In an example, the area (411) is already reconstructed and is referred to as a reconstructed area. A current template (401) of the current block (431) may include neighboring samples of the current block (431). In an example, the current template (401) may be used to determine (e.g., find out) the best matching of a reconstructed block for the current block (431) in the current picture (410).

By comparing the current template (401) of the current block (431) with templates (e.g., reference templates) of respective reference blocks, a best matching reference template (e.g., a reference template (402) shown in FIG. 4) may be found in the reconstructed area (411), for example, if an error (e.g., a cost function based on a sum of absolute differences (SAD)) between the reference template (402) and the current template (401) is the minimum among errors between the reference templates and the current template (401). After that, the reference block (e.g., a reference block (432) shown in FIG. 4) with the minimal error may be used to predict the current block (431). In an example, the reference template (402) and the current template (401) may have a same shape and a same size. A location of the reference template (402) with respect to the reference block (432) may be identical to a location of the current template (401) with respect to the current block (431).

In an example, values of reference samples in the reference block (432) are copied as a prediction signal of the current block (431). For example, the reference block (432) is the prediction signal, and predicted values of samples in the current block (431) are the values of the reference samples in the reference block (432), respectively.

Figure 5:
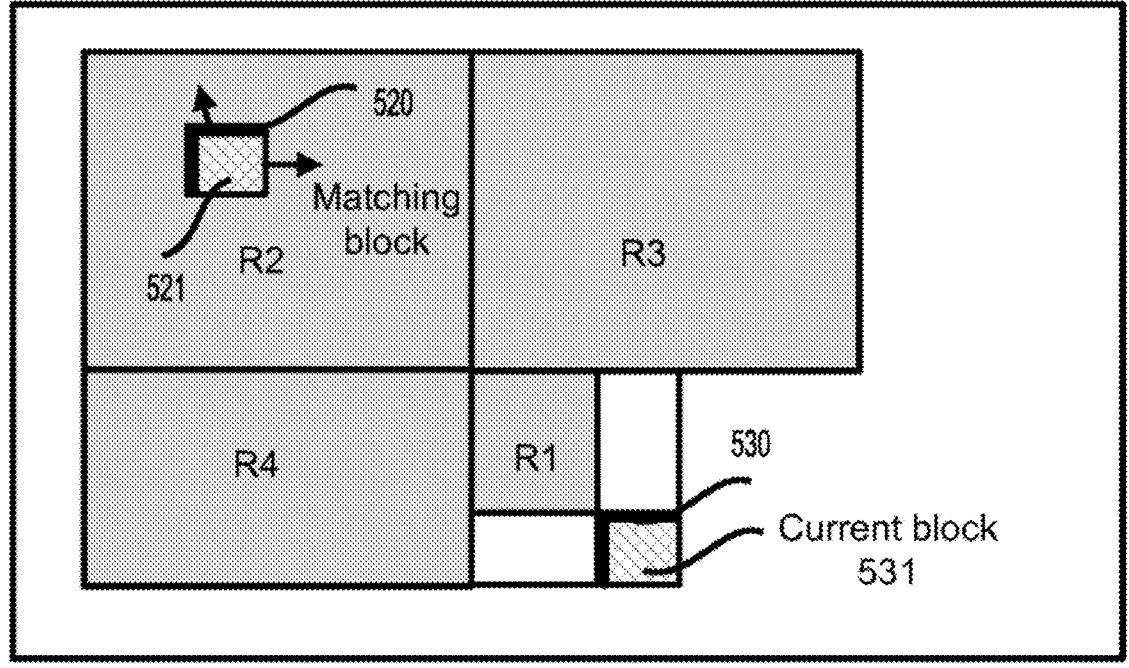
FIG. 5 shows an example of an intra template matching prediction (IntraTMP) mode according to an aspect of the disclosure.

In an example, the method described in FIG. 4 is an intra template matching prediction (IntraTMP) mode. In an example, the IntraTMP mode is a special intra prediction mode, and is used in intra prediction. FIG. 5 shows an example of the IntraTMP mode according to an aspect of the disclosure. Referring to FIG. 5, in an example of the IntraTMP mode, a prediction block (521) such as the best prediction block from a reconstructed part of a current picture (or a current frame) may be copied. A template (520) such as an L-shaped template of the prediction block (521) may match a current template (530) of a current block (531) in the current picture. For a predefined search range, an encoder may search for the most similar template to the current template (530) in the reconstructed part of the current frame and may use the corresponding block (521) as a prediction block (also referred to as a reference block). In an example, the encoder then signals the usage of the IntraTMP mode, and the same prediction operation is performed at the decoder side.

Referring to FIG. 5, the prediction signal may be generated by matching the L-shaped template (530) of the current block (531) with another template in a predefined search area. In an example, the predefined search area includes: R1 that is a current CTU, R2 that is a top-left CTU of the current CTU, R3 that is an above CTU of the current CTU, and R4 that is a left CTU of the current CTU. In an example, an SAD is used as a cost function.

Within each region, the decoder may search for a template that has a least cost (e.g., a least SAD) with respect to the current template and may use a block (e.g., a reference block) corresponding to the least cost as a prediction block.

The dimensions of all regions (SearchRange_w, SearchRange_h) may be set to be proportional to a block dimension (BlkW, BlkH) to have a fixed number of SAD comparisons per pixel. In an example, SearchRange_w=a× BlkW, and SearchRange_h=a×BlkH, where 'a' is a constant that controls a trade-off between gain and complexity. In an example, 'a' is equal to 5.

To speed-up the template matching process, in some examples, the search range of all search regions is subsampled, for example, by a factor of 2, and thus leading to a reduction of template matching search by 4. After finding the best match, a refinement process may be performed. The refinement process may be performed via a second template matching search around the best match with a reduced range. In an example, the reduced range is defined as min (BlkW, BlkH)/2.

An intra block copy (IBC) mode may be used to predict a block in a current picture, for example, from a reference block (e.g., a reconstructed block) in the current picture. The IBC mode may be implemented as a block level coding mode, and block matching (BM) may be performed at the encoder to find an optimal block vector (BV) for each CU. In the IBC mode, a BV may be used to indicate a displacement from the current block to a reference block, which is already reconstructed inside the current picture.

At the encoder side, in an example, hash-based motion estimation may be performed for the IBC mode. The encoder may perform rate-distortion (RD) check for blocks with either width or height no larger than 16 luma samples. For a non-merge mode, the block vector search may be performed using hash-based search first. If hash search does not return a valid candidate, block matching based local search may be performed.

In the hash-based search, hash key matching (32-bit CRC) between the current block and a reference block may be extended to all allowed block sizes. The hash key calculation for every position in the current picture may be based on 4×4 subblocks. For the current block of a larger size, a hash key may be determined to match that of the reference block when all the hash keys of all 4×4 subblocks match the hash keys in the corresponding reference locations. If hash keys of multiple reference blocks are found to match that of the current block, the block vector costs of each matched reference may be calculated and the one with the minimum cost may be selected.

In block matching search, the search range may be set to include both the previous and current CTUs (e.g., the previously reconstructed CTU and the current CTU).

In an aspect, referring back to FIG. 4, a linear model may be built between a current template and a reference template, such as between the current template (401) and the reference template (402). After modeling (e.g., after determining the linear model), the reference samples in the reference block (432) may be used as an input to the linear model to generate a prediction output for the current block (431). In an example, the current block (431) may be predicted from the prediction output instead of from the reference block (432) directly.

Figure 6A:
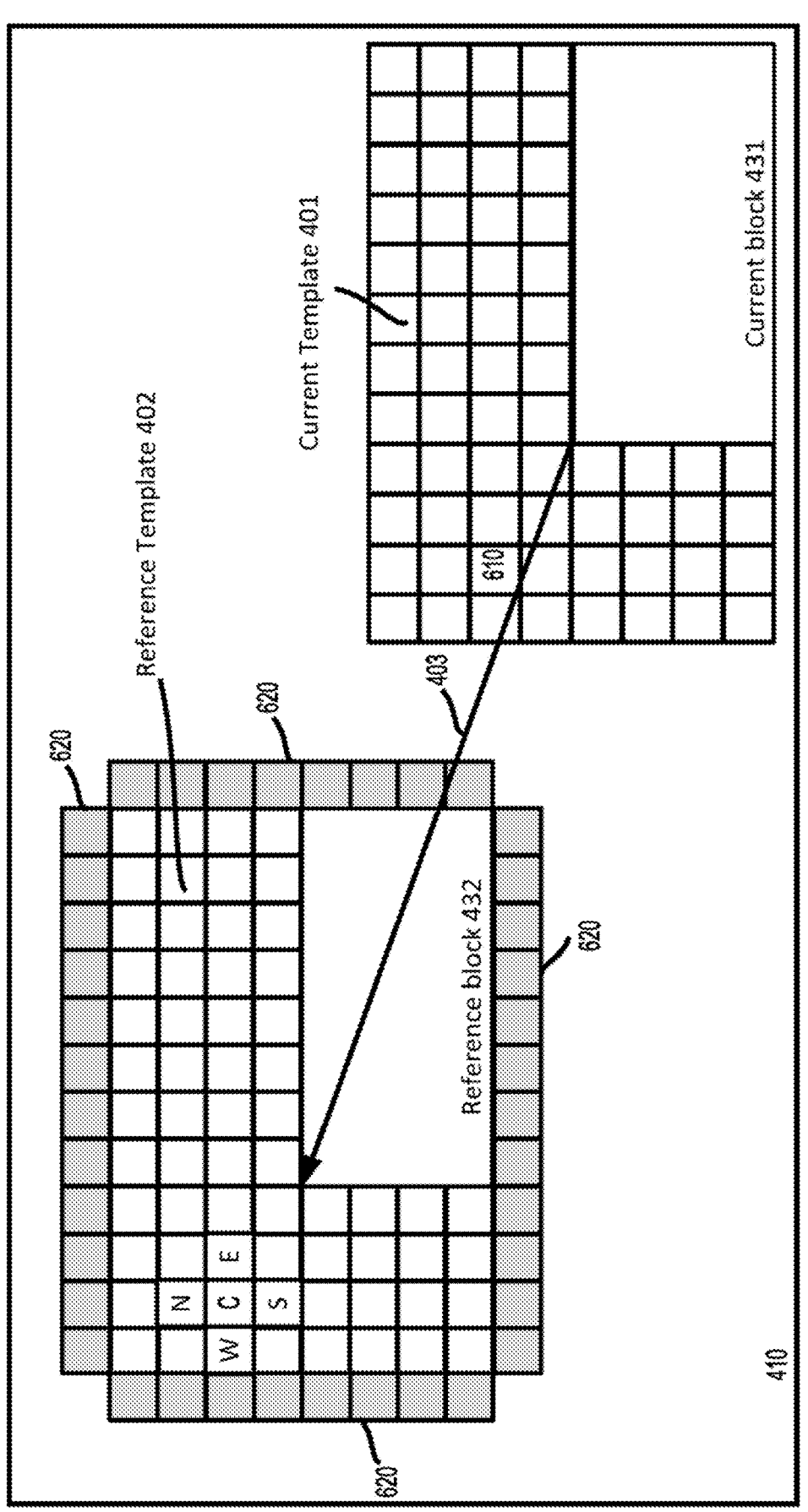
FIG. 6A shows an example of building a linear model using a current template of a current block and a reference template of a reference block according to an aspect of the disclosure.

FIG. 6A shows an example of building the linear model using the current template (401) and the reference template (402) according to an aspect of the disclosure. The current template (401), the reference template (402), the current block (431), the reference block (432), and the current picture (410) that are described in FIG. 4 are redrawn in FIG. 6A.

In the example of FIG. 6A, a template size of the current template (401) and the reference template (402) has four lines (e.g., four rows and/or four columns) of samples, and the current template (401) and the reference template (402) have an "L" shape. The description may be applicable or may be suitably adapted to any template size (e.g., more than 4 lines or less than 4 lines (e.g., 3 lines)) and any suitable shape (e.g., the "L" shape, a left template only, a top template only, or the like) of the current template (401) and the reference template (402).

In an aspect, each sample (e.g., a sample (610) shown in FIG. 6A) in the current template (401) may be represented (e.g., predicted) using the linear model shown in Eq. (1).

$$predVal = c_0 \times valC + c_1 \times valN + c_2 \times valS + c_3 \times valE + c_4 \times \qquad \text{Eq. (1)}$$
$$valW + c_5 B$$

The predVal may be a predicted value of the sample (610) in the current template (401). valC, valN, valS, valE, and valW may be sample values of respective samples C, N, S, E, and W in the reference template (402). Referring to FIG. 6A, C is a center (C) sample. C may correspond to the sample (610) to be predicted in the current template (401). In an example, a relative location of C in the reference template (402) is identical to a relative location of the sample (610) in the current template (401). N, S, E, and W are an above/north neighbor (N) of C, a below/south neighbor(S) of C, a right/east neighbor (E) of C, and a left/west neighbor (W) of C. c0 to c5 are coefficients (also interchangeably referred to as parameters) of the linear model. The coefficients c0 to c4 correspond to the samples C, N, S, E, and W. B is a bias term. The coefficient c5 corresponds to the bias term B.

The reference template (402) may be surrounded by samples in a region (620) (shaded in gray). Referring to FIG. 6A, the region (620) surrounds the reference template (402). In an example, when one of the samples N, S, E, and W is outside the reference template (402) (e.g., the one of the samples N, S, E, and W is in the region (620)), the one of the samples N, S, E, and W that is in the region (620) may be used as an input sample (e.g., an extra dependent input sample) for the linear model.

In an example, the linear model described in Eq. (1) is a filter (e.g., a linear filter) defined based on the samples C, N, S, E, and W. In the example shown in FIG. 6A, a filter shape of the linear model has a cross shape.

To learn (e.g., to determine) the parameters (e.g., c0 to c5) of the linear model, a method, such as an LDL decomposition, a Cholesky decomposition, a variant of the LDL decomposition, and/or the like, may be used. In an example of the LDL decomposition, a matrix A may be decomposed as $A=LDL^T$. L is a lower unit triangular (unitriangular) matrix, D is a diagonal matrix, and $L^T$ is a transpose of L. In an example, the coefficients c0 to c5 may be derived based on the minimization of a difference between values of the reconstructed samples in the current template (401) and the predicted values (e.g., using Eq. (1)) of the reconstructed samples the current template (401), for example, via a regression-based minimization technique.

Figure 6B:
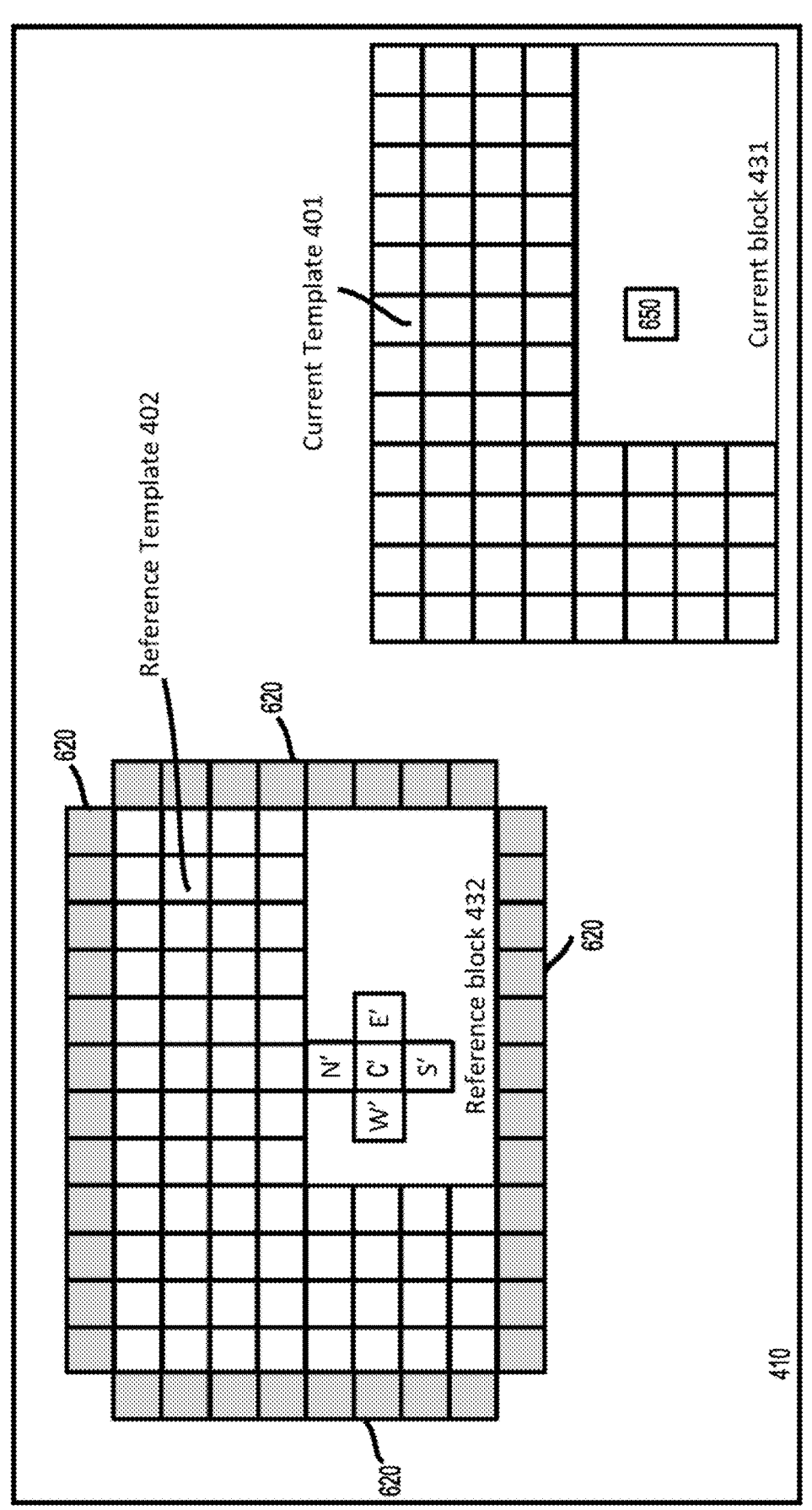
FIG. 6B shows an example of applying the linear model to the reference block to determine a prediction signal of the current block according to an aspect of the disclosure.

After the parameters (e.g., c0 to c5) of the linear model are determined, a prediction signal of the current block (431) may be derived based on the samples values in the reference block (432) and the linear model. FIG. 6B shows an example of applying the linear model with the determined parameters to the reference block (432) to determine the prediction signal of the current block (431) according to an aspect of the disclosure. The current template (401), the reference template (402), the current block (431), the reference block (432), the current picture (410), and the region (620) that are described in FIGS. 4 and/or 6A are redrawn in FIG. 6B.

In an aspect, a predicted value predVal' of a sample (e.g., a sample (650) shown in FIG. 6B) in the current block (431) may be determined using the linear model such as shown in Eq. (2).

$$predVal' = c_0 \times valC' + c_1 \times valN' + c_2 \times valS' + c_3 \times valE' + c_4 \times valW' + c_5B \quad \text{Eq. (2)}$$

valC', valN', valS', valE', and valW' may be sample values of respective samples C', N', S', E', and W' in the reference block (432). Referring to FIG. 6B, C' is a center (C') sample. C' may correspond to the sample (650) to be predicted in the current block (431). In an example, a relative location of C' in the reference block (432) is identical to a relative location of the sample (650) in the current block (431). N', S', E', and W' are an above/north neighbor (N') of C', a below/south neighbor (S') of C', a right/east neighbor (E') of C', and a left/west neighbor (W') of C'. c0 to c5 are the same coefficients of the linear model that are determined as described above with reference to FIG. 6A.

In an aspect, referring to FIGS. 6A-6B, when the reference block (432) is determined using the IntraTMP mode or the IBC mode, the method described in FIGS. 6A-6B may be referred to as a filtered intra block copy (FIBC) mode. For example, the prediction samples of the IBC mode or the IntraTMP mode may be enhanced by applying a linear filter (e.g., the linear model having the coefficients c0-c5 such as described using Eqs. (1)-(2)) to the reference block (432). In some examples, such as shown in FIGS. 6A-6B, up to 4 lines/columns of samples above and left to the current block (431) may be applied to derive the coefficients (e.g., c0-c5).

In the method described with reference to FIGS. 6A-6B, the correlation between the current template (401) and the reference template (402) is determined and may be indicated by the linear model. The current template (401) and the reference template (402) are close (e.g., spatially close) to the current block (431) and the reference block (432), respectively. Thus, the learned correlation may be applied to the current block (431) and the reference block (432). In an example, from the perspective of machine learning, the building of the linear model such as shown in FIG. 6A and Eq. (1) may be referred to as a training stage, and the prediction of the current block (431) such as shown in FIG. 6B and Eq. (2) may be referred to as an inferencing stage. The methods described in FIGS. 6A-6B may be referred to as a training-inferencing method.

The training-inferencing method (e.g., described in FIGS. 6A-6B and the FIBC mode) may be used to predict a current block (e.g., the current block (431)) within a same picture (or a same frame) as a reference block (e.g., the reference block (432)), and thus are intra (-frame) prediction.

In some examples, the training-inferencing method using templates such as a current template and a reference template is not limited to intra prediction, and may be applied to inter prediction and to improve the inter prediction. In the inter prediction, a reference template and a current template may be located within different pictures. In the inter prediction, a prediction signal (e.g., an inter-predicted signal) of a current block may be generated by any suitable inter prediction method, for example, using a motion compensation approach), as the inter prediction method may be an effective way to exploit temporal redundancy. Templates may be used to compensate the prediction signal (e.g., the inter-predicted signal) of the current block using the training-inferencing approach. In the case of the inter prediction, a linear model may be determined based on the reference template and the current template located within the different pictures, and then may be applied to update (e.g., correct) the prediction signal. The current block may be predicted based on the updated prediction signal. The linear model in the inter prediction may be identical to or different from the linear model in FIGS. 6A-6B. In an example, the linear model in the inter prediction is different from the linear model in FIGS. 6A-6B. For example, the linear model in the inter prediction may learn (e.g., determine) an offset (e.g., a bias term) to the prediction signal (e.g., the inter-predicted signal). The offset (e.g., the predicted offset) may be used to correct the prediction signal (e.g., the inter-predicted signal) and thus improving the prediction quality.

In an aspect, each sample in the current template may be predicted (or corrected) using the linear model shown in Eq. (3) based on a sample value valC" of a sample C" in the reference template.

$$predVal''' = c_6 \times valC''' + c_7B'' \qquad \text{Eq. (3)}$$

The predVal" may be a predicted value of the sample in the current template. In an example, a relative location of C" in the reference template is identical to a relative location of the sample in the current template. $c_6$ and $c_7$ are coefficients (or parameters) of the linear model. The coefficient $c_6$ corresponds to the sample C". B" is a bias term. The coefficient $c_7$ corresponds to the bias term B".

Similarly as described in FIGS. 6A-6B, after the parameters (e.g., $c_6$ and $c_7$) of the linear model in Eq. (3) are determined, a prediction signal of the current block may be derived based on the samples values in the reference block and the linear model in Eq. (3). In some examples, the prediction signal may be considered as an updated prediction signal if the reference block is considered as the prediction signal. In an aspect, a predicted value predVal'" of a sample in the current block may be determined using the linear model such as shown in Eq. (4) based on a sample value valC'" of a sample C'" in the reference block.

$$predVal''' = c_6 \times valC''' + c_7B'' \qquad \text{Eq. (4)}$$

A common feature for the above template approaches (such as described in Eqs. (1) and (3)) includes that samples (e.g., reconstructed samples) in the current template and the reference template (e.g., the current template (401) and the reference template (402)) used to determine the linear model (e.g., the linear model in Eqs. (1)-(2) or the linear model in Eqs. (3)-(4)) are used directly (e.g., without modification). In some examples, using the reconstructed samples directly in the current template and the reference template may not result in an optimal model (e.g., an optimal linear model) to exploit the correlation between neighboring blocks. In some examples, a modified version of the current template and/or a modified version of the reference template may be used to represent the correlation in a more accurate way.

The methods, aspects, and examples described in the disclosure may be used separately or combined in any order. The term "the IBC mode" may refer to the IBC mode described in the disclosure or a variant. The term "the IntraTMP mode" may refer to the IntraTMP mode described in the disclosure or a variant. The term "the FIBC mode" may refer to the FIBC mode described in the disclosure or a variant.

A current block in a current picture may be predicted based on a reference block. In an aspect, the reference block may be in the current picture, for example, determined using the method shown in FIG. 4. In some examples, the reference block is in the current picture and is determined using the IntraTMP mode. In some examples, the reference block is in the current picture and is determined using the IBC mode. In an aspect, the reference block may be determined using the inter prediction and may be in a reference picture that is different from the current picture.

According to an aspect of the disclosure, the reference block is not copied directly to predict the current block. In an aspect, samples (also referred to as reference samples) in the reference block may be input to a linear model to generate a prediction signal of the current block, and thus the linear model is applied to the reference block to determine the prediction signal of the current block. Eqs. (1)-(4) show some examples of the linear model. Examples of applying the linear model to generate the prediction signal of the current block are described using Eqs. (2) and (4).

In various examples, a block and a template (e.g., including neighboring samples of the block) of the block may share similar texture characteristics, for example, because the block and the template are spatially close to each other. Thus, the linear model may be determined based on a reference template of the reference block and a current template of the current block.

Eqs. (1)-(4) show some examples of the linear model. The linear model may be any suitable linear model, and may have any suitable shape and/or any suitable size (e.g., 5 samples, more than 5 samples, or less than 5 samples). Eqs. (1)-(2) and FIGS. 6A-6B show an example of a cross shape. Referring to FIG. 6B, the shape includes the 5 samples C', N', S', E', and W'. The sample C' is the center sample that corresponds to the sample (650) that is being predicted in the current block (431). Other linear models may be used with five samples including C' and other four samples different from N', S', E', and W'. Another linear model may include less than five samples or more than five samples. In the example shown in Eq. (4), the linear model only includes the sample C'" and the bias term (e.g., the offset).

According to as aspect of the disclosure, the current template and/or the reference template may be filtered (e.g., modified) prior to determining the linear model. In some examples, the filtered current template and/or filtered reference template may be used to determine the linear model, and the linear model can be applied to the reference block to predict the current block.

Figure 7:
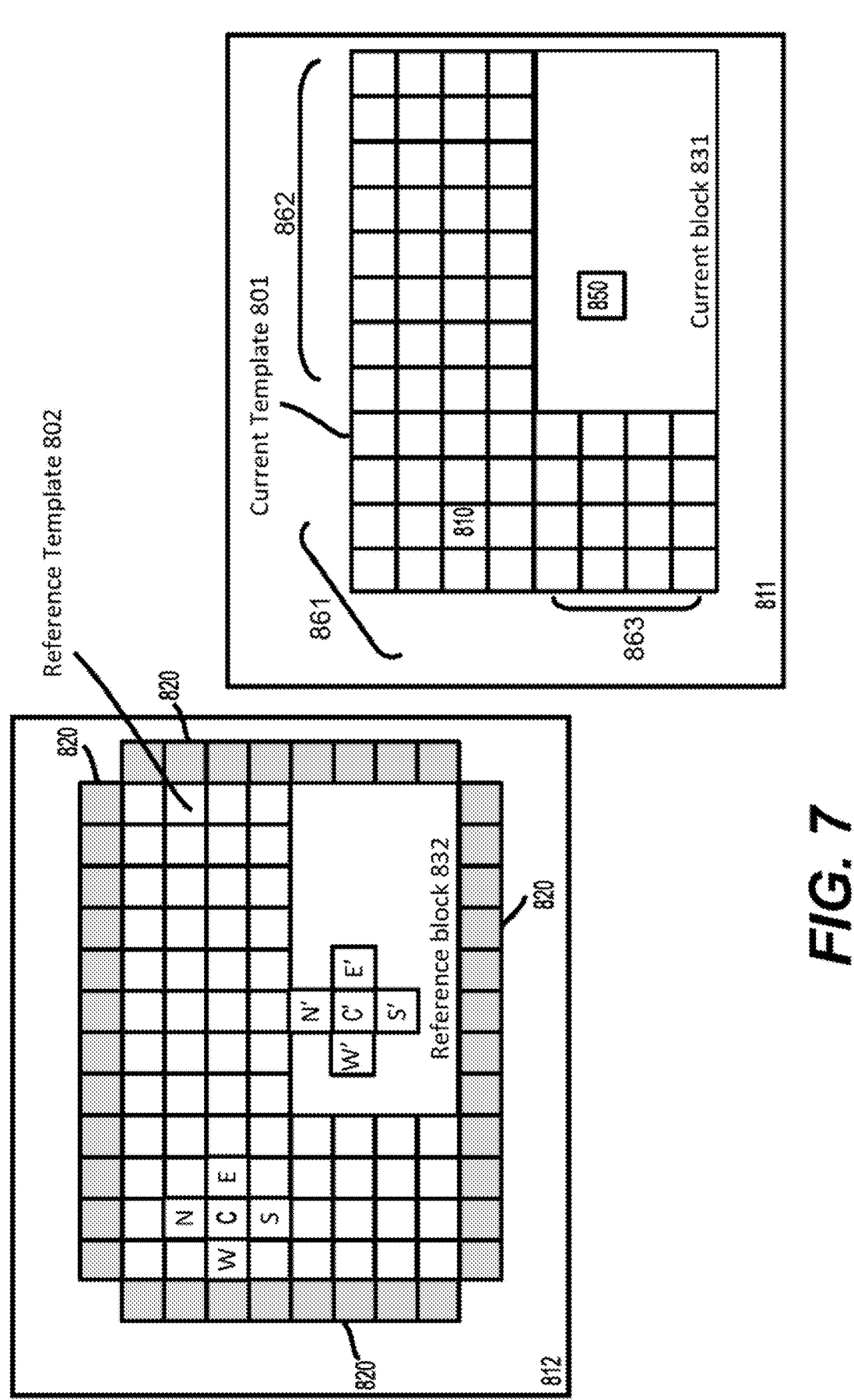
FIG. 7 shows an example to predict a current block in a current picture based on a reference block of the current block according to an aspect of the disclosure.

FIG. 7 shows an example to predict a current block (831) in a current picture (811) based on a reference block (832) of the current block (831). The reference block (832) is in a reference picture (812). According to an aspect of the disclosure, a plurality of samples in the at least one of a current template (801) of the current block (831) and a reference template (802) of the reference block (832) may be filtered. A linear model between the current template (801) and the reference template (802) may be determined based on the current template (801) and the reference template (802) where the plurality of samples in the at least one of the current template (801) and the reference template (802) is filtered. For example, the linear model between the current template (801) and the reference template (802) may be determined based on the filtered plurality of samples in the at least one of the current template (801) and the reference template (802). The current block (831) may be reconstructed based on the linear model and the reference block (832).

In an example, the reference picture (812) is the current picture (811), and the reference block (832) is in the current picture (811). In an example, the current block (831) is predicted according to the method described in FIG. 4. In an example, the current block (831) is predicted according to the IntraTMP mode, such as described in FIG. 5. In an example, the current block (831) is predicted according to the IBC mode.

In an example, the current picture (811) is different from the reference picture (812), and the reference block (832) is in the reference picture (812) that is different from the current picture (811). The current block (831) may be predicted according to any suitable inter prediction method.

In an aspect, the current template (801) may include neighboring samples (e.g., neighboring reconstructed samples) of the current block (831). The reference template (802) may include neighboring samples (e.g., neighboring reconstructed samples) of the reference block (832). The current template (801) and the reference template (802) may have any suitable shape and any suitable size. The current template (801) and the reference template (802) may have a same shape and may have a same size. In the example shown in FIG. 7, the current template (801) and the reference template (802) include 4 lines of reconstructed samples that neighbor the current block (831) and the reference block (832), respectively. In the example shown in FIG. 7, the current template (801) and the reference template (802) have an L shape.

In an aspect, the linear model between the current template (801) and the reference template (802) may be determined similarly as described in FIG. 6A except that the plurality of samples in the at least one of the current template (801) and the reference template (802) is filtered. In an example, the reference block (832) is in the current picture (811), and the current block (831) is predicted according to the methods described in FIGS. 4-5. The linear mode may be described using Eqs. (1)-(2). The coefficients $c_0$-$c_5$ may be determined using the current template (801) and the reference template (802) where the plurality of samples in the at least one of the current template (801) and the reference template (802) is filtered.

In an example, the reference block (832) is in the reference picture (812) that is different from the current picture (811), and the current block (831) is predicted according to the inter prediction method. The linear mode may be described using Eqs. (3)-(4). The coefficients $c_6$-$c_7$ may be determined using the current template (801) and the reference template (802) where the plurality of samples in the at least one of the current template (801) and the reference template (802) is filtered.

In an aspect, the current block (831) may be reconstructed based on the linear model and the reference block (832). The linear model may be applied to the reference block (832) to determine a prediction signal for the current block (831). For example, the prediction signal for the current block (831) includes predicted values of samples in the current block (831) similarly as described in FIG. 6B and Eq. (2) or as described in Eq. (4). The current block (831) may be reconstructed based on the predicted values of samples.

Compared to the case where the reference block (832) is copied directly to predict the current block (831) (e.g., the reference block (832) that is unmodified is used as a prediction signal for the current block (831)), the prediction signal for the current block (831) determined based on the linear mode (e.g., described in Eq. (2) or Eq. (4)) may be referred to as an updated (or corrected) prediction signal for the current block (831).

In an example, the reference block (832) is in the current picture (811), a predicted value of a sample (e.g., (a sample (850)) in the current block (831) is a weighted sum of a sample C' in the reference block (832), a plurality of neighboring samples (e.g., N', S', E', and W') of the sample C' in the reference block (832), and a bias term according the linear model such as described in FIG. 6B and Eq. (2).

In an example, the reference block (832) is in the reference picture (812) that is different from the current picture (811), a predicted value of the sample (e.g., (the sample (850)) in the current block (831) is a weighted sum of the sample C' in the reference block (832) and a bias term according to the linear model such as described in Eq. (3).

In an aspect, the at least one of the current template (801) and the reference template (802) includes the current template (801) and the reference template (802), and a filter may be applied to the plurality of samples in the current template (801) and the reference template (802). The filter may be referred to as a unified filter. A modified version of the current template (801) (e.g., the filtered current template (801)) and a modified version of the reference template (802) (e.g., the filtered reference template (802)) may be used to determine the linear model, for example, similarly as described in Eqs. (1) or (3). For example, referring to Eq. (1), valC, valN, valS, valE, and valW in Eq. (1) may be filtered sample values of the respective samples C, N, S, E, and W in the filtered reference template (802). Further, the coefficients (e.g., $c_0$-$c_5$ in Eq. (1) or $c_6$-$c_7$ in Eq. (3)) of the linear model may be derived based on the minimization of a difference between values of the reconstructed samples in the filtered current template (801) and the predicted values of the current template (801) that are obtained based on the filtered reference template (802) using, for example, Eq. (1) or Eq. (3). Thus, the modified version of the current template (801) and the modified version of the reference template (802) may be used to train the correlation between neighboring blocks.

In an aspect, filters applied to the current template (801) and the reference template (802) may be different. Thus, a first filter is applied to samples in the current template (801) and a second filter is applied to the reference template (802). The second filter is different from the first filter. For example, first samples in the current template (801) may be filtered with the first filter and second samples in the reference template (802) may be filtered with the second filter. The plurality of samples may include the first samples in the current template (801) and the second samples in the reference template (802).

In an aspect, only one of the current template (801) and the reference template (802) is filtered, and another one of the current template (801) and the reference template (802) is unfiltered. For example, the at least one of the current template (801) and the reference template (802) consists of the current template (801) or the reference template (802). In an example, the at least one of the current template (801) and the reference template (802) consists of the current template (801), and one filter is applied to samples in the current template (801) and the reference template (802) is unmodified (e.g., the reference template (802) is not filtered). A modified version of the current template (801) (e.g., the filtered current template (801)) and the reference template (802) that is unfiltered may be used to determine the linear model similarly as described in Eqs. (1) or (3).

In an aspect, one filter is applied to samples in the reference template (802) while the current template (801) is unmodified. For example, the at least one of the current template (801) and the reference template (802) consists of the reference template (802), and one filter is applied to samples in the reference template (802) and the current template (801) is unmodified (e.g., the current template (801) is not filtered). A modified version of the reference template (802) (e.g., the filtered reference template (802)) and the current template (801) that is unfiltered may be used to determine the linear model similarly as described in Eqs. (1) or (3).

Any suitable filter(s) may be used to filter the at least one of the current template (801) and the reference template (802). The filter(s) may have any suitable shape(s) and any suitable size(s). In an aspect, a 3×3 filter F is used to filter the samples in a template, such as to filter the plurality of samples in the at least one of the current template (801) and the reference template (802). An example of the 3×3 filter F is given in Eq. (5). In an example, the plurality of samples in the at least one of the current template (801) and the reference template (802) may be filtered using the 3×3 filter F.

$$F = \begin{bmatrix} -1 & -1 & -1 \\ -1 & 10 & -1 \\ -1 & -1 & -1 \end{bmatrix} \qquad \text{Eq. (5)}$$

Figure 8:
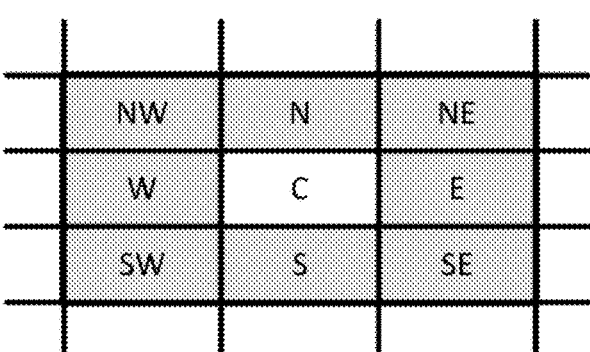
FIG. 8 shows an example of a shape of a 3×3 filter F according to an aspect of the disclosure.

FIG. 8 shows an example of a shape of the 3×3 filter F according to an aspect of the disclosure. Referring to FIG. 8 and Eq. (5), a center coefficient (e.g., having a value of 10) in the 3×3 filter F may correspond to a center position C in FIG. 8, and neighboring samples (e.g., NW, N, NE, W, E, SW, S, and SE) of the center position C have a coefficient of −1.

In an aspect, a syntax element (e.g., a flag) may be signaled in a bitstream to indicate whether a filter is applied to the plurality of samples in the at least one of the current template (801) and the reference template (802). For example, the flag may indicate whether the filtering is to be applied to the at least one of the current template (801) of the current block (831) and the reference template (802) of the reference block (832). The template(s) to be filtered may include the reference template (802) and/or the current template (801).

In an aspect, the syntax element (e.g., the flag) may be signaled at a block level or a high-level that is higher than the block level. For example, the flag may be signaled either at the block level or in a high-level syntax including but not limited to a slice header, a picture header, a sequence header, or the like.

In an aspect, the filtering of the template(s) (e.g., the at least one of the current template (801) and the reference template (802)) may be applied for a luma component only. For example, the filtering is applied to the at least one of the current template (801) and the reference template (802) only when the current block (831) is a luma block, and the filtering is not applied when the current block (831) is a chroma block.

In an aspect, the filtering of the template(s) (e.g., the at least one of the current template (801) and the reference template (802)) may be applied for both the luma component and chroma component(s). In an example, the chroma component(s) include Cb and Cr.

In an example, the current block (831) is a luma block or a chroma block, and the filtering of the template(s) (e.g., the at least one of the current template (801) and the reference template (802)) may be applied.

As described above, the current template (801) may have any suitable size and any suitable shape. In the example shown in FIG. 7, the current template (801) has an L shape and includes 4 lines of reconstructed samples that are above the current block (831) and/or to the left the current block (831). For example, referring to FIG. 7, the current template (801) includes a top template (862) that is directly above the current block (831), a left template (863) that is to the left of the current block (831), and a top-left corner template (861) between the top template (862) and the left template (863).

In an example, the current template (801) may include only the top template (862). In an example, the current template (801) may include only the left template (863).

In an aspect, a template size of a template (e.g., the current template (801) or the reference template (802)) may be extended, for example, to the top right and to the bottom left.

Figure 9:
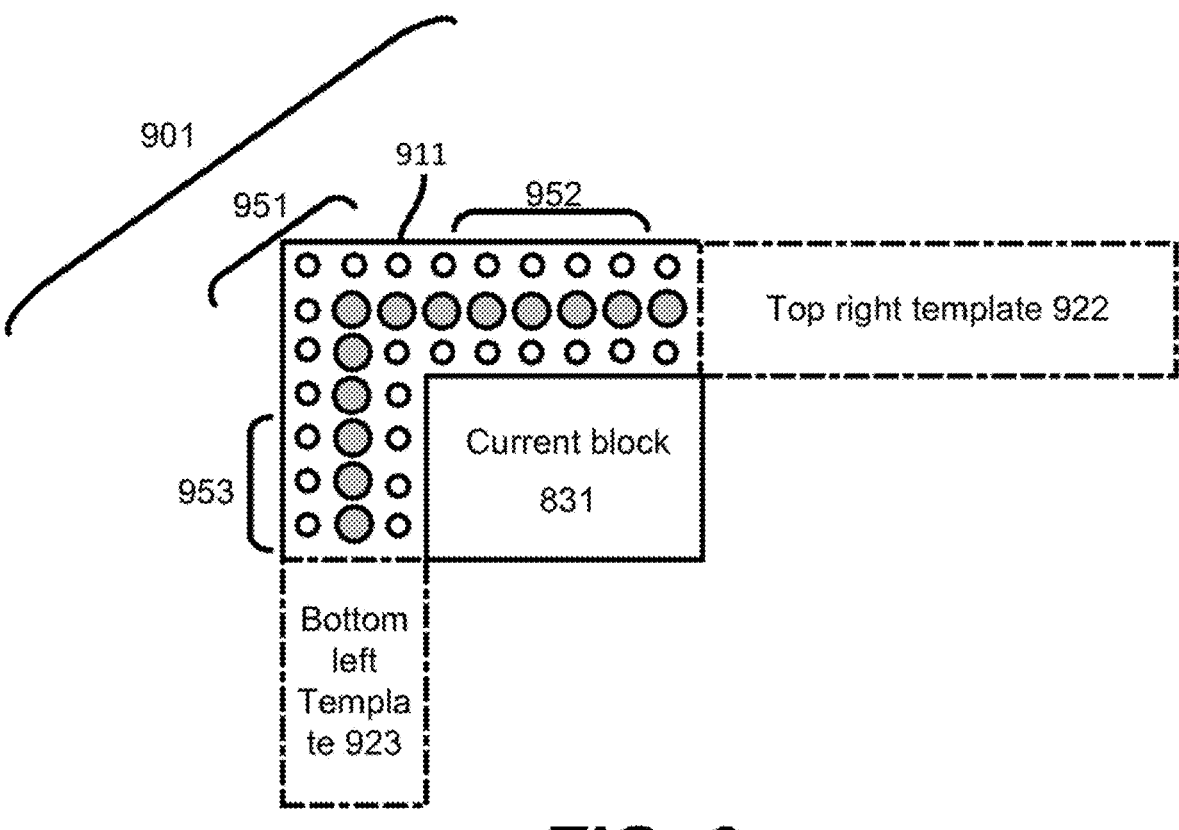
FIG. 9 shows an example of a current template that is extended according to an aspect of the disclosure.

FIG. 9 shows an example of a current template (911) of the current block (831) that is extended according to an aspect of the disclosure. In the example shown in FIG. 9, the current template (911) includes 3 lines of reconstructed samples that are above the current block (831) and to the left the current block (831). Referring to FIG. 9, the current template (911) includes a top template (952) that is directly above the current block (831), a left template (953) that is to the left of the current block (831), and a top-left corner template (951) between the top template (952) and the left template (953). The current template (911) in FIG. 9 is extended to the top right of the current block (831) and to the bottom left of the current block (831) to form an extended current template (901). The extended current template (901) of the current block (831) includes the top template (952) that is directly above the current block (831), the left template (953) that is to the left of the current block (831), the top-left corner template (951), a top-right template (922) that is above and to the right of the current block (831), and a bottom-left template (923) that is below and to the left of the current block (831). The reference template (not shown) corresponds to the extended current template (901) may have a same shape and a same size as the extended current template (901).

In an example, the extended size(s) of the top-right template (922) and the bottom-left template (923) may be based on a width W and a height H of the current block (831). For example, a width of the top-right template (922) is 2W. A height of the bottom-left template (923) is 2H.

In an aspect, the plurality of samples is a subset of samples in the at least one of the current template of the current block and the reference template of the reference block. In an aspect, the filter is not applied to all the samples in a template (e.g., the current template or the reference template), but to a subset of the samples in the template. In an example, referring to FIG. 9, only one line (e.g., dark dots in a middle line) such as only one row/column of the samples in the template (e.g., the current template (911)) are filtered. In an example, referring to FIG. 9, when the current template (911) is filtered, only the dark dots in the middle line are filtered, and thus the plurality of samples includes the dark dots and does not include other samples in the current template (911). In an example, when the reference template corresponding to the current template (911) is filtered, only samples in the middle line in the reference template are filtered.

Figure 10:
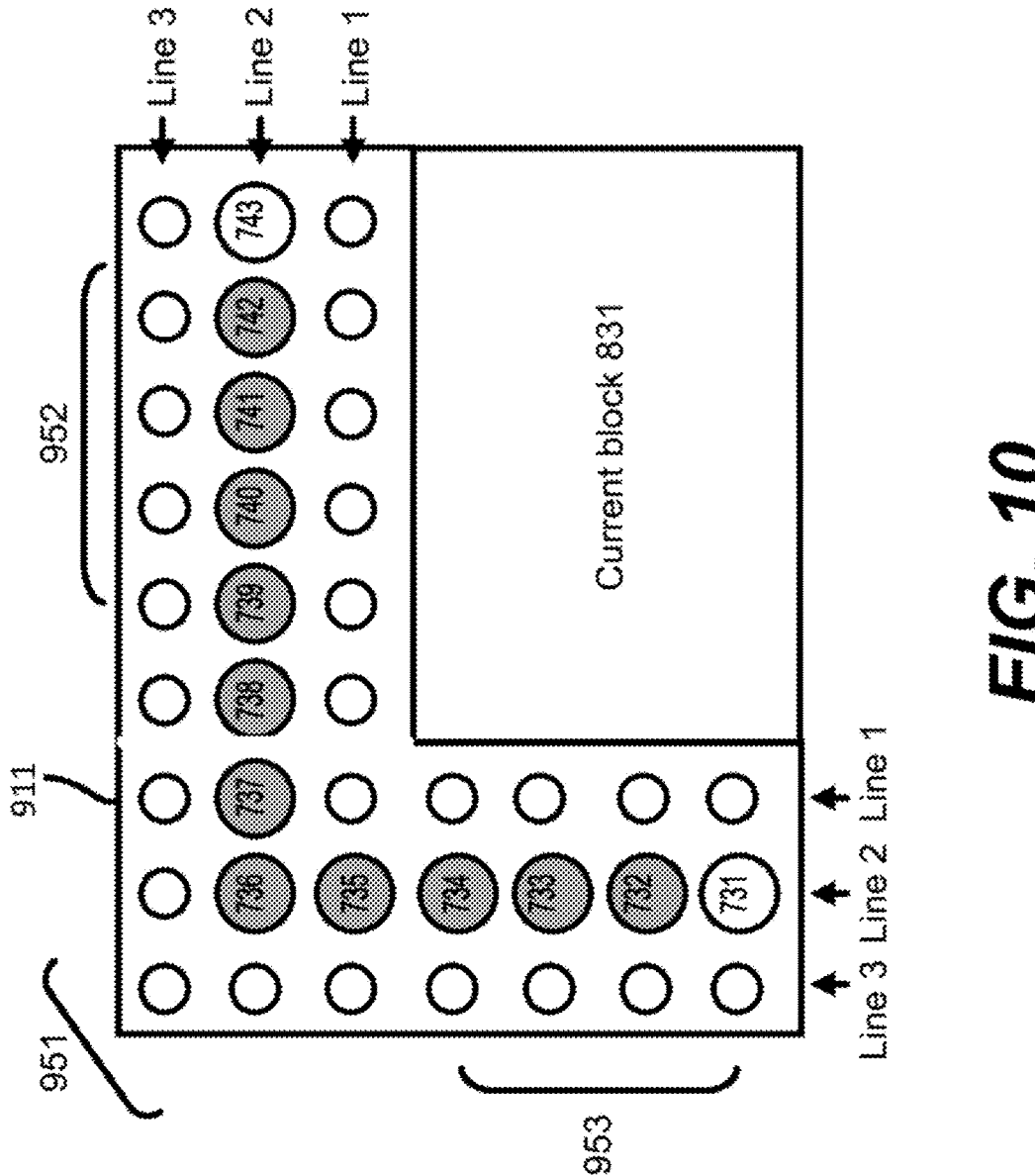
FIG. 10 shows an example of a current template where a filter is not applied to two samples at the end of the middle row/column according to an aspect of the disclosure.

In an aspect, the filter may not be applied to the samples in a complete line such as the complete line including a complete row and a complete column in the template, but a subset of the samples in the complete line. FIG. 10 shows an example of the current template (911) where the filter is not applied to two samples at the end of the middle row/column. The current template (911) includes three lines, such as a line 1, a line 2, and a line 3. The current template (911) in FIG. 10 includes the top template (952) that is directly above the current block (831), the left template (953) that is to the left of the current block (831), and the top-left corner template (951) between the top template (952) and the left template (953) as described in FIG. 9. When the current template (911) in FIG. 10 is filtered, the filter is only applied to the samples (732)-(742) (dark dots in FIG. 10), and the end samples (731) and (743) are not filtered. In an example, a center position of the filter (e.g., the filter F shown in FIG.

8) corresponds to the middle line (e.g., the line 2) which includes the middle row and/or the middle column in the current template (911).

Figure 11:
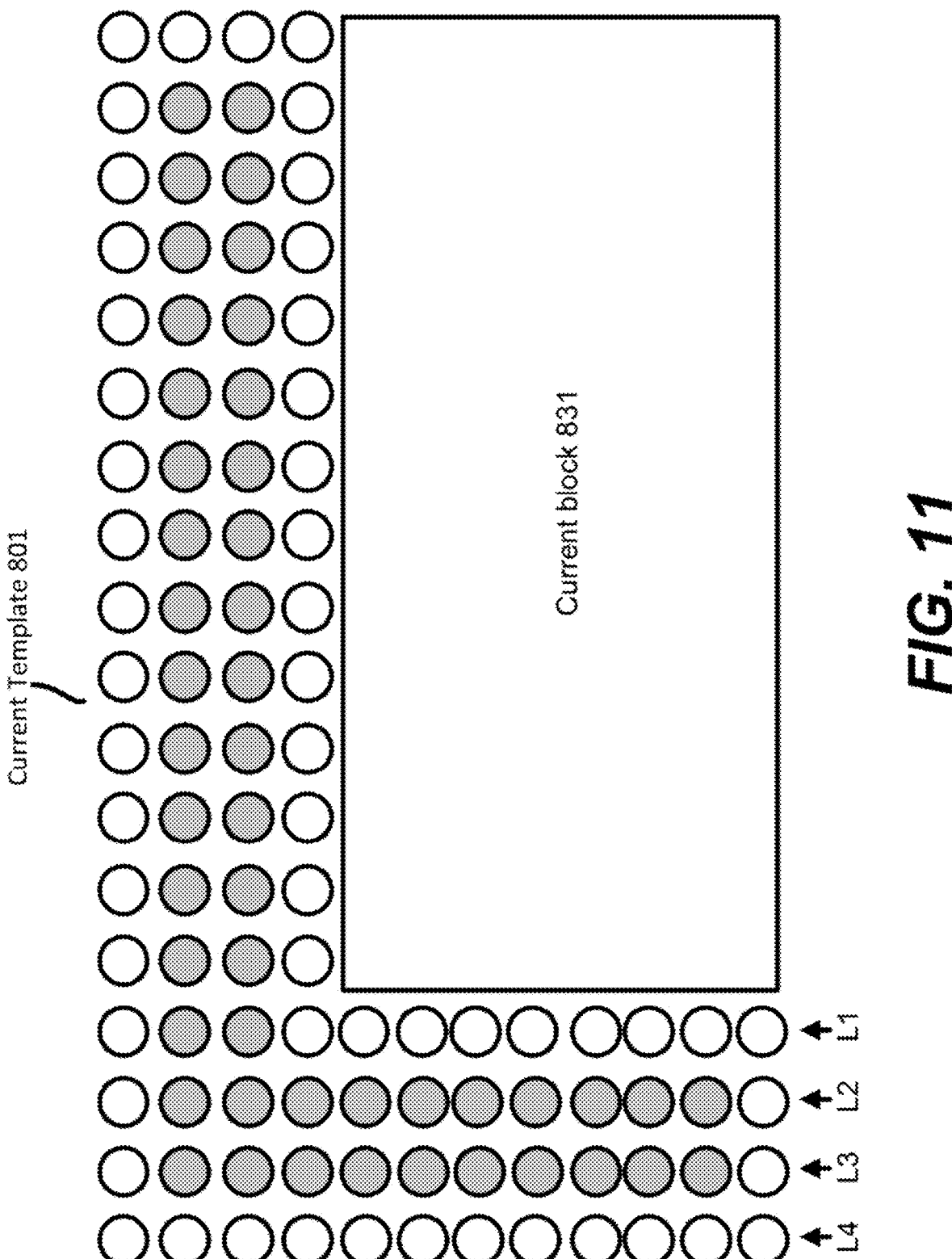
FIG. 11 shows an example when two lines of samples of a current template are filtered according to an aspect of the disclosure.

In an aspect, more than lines (e.g., more than one rows and/or more than one columns) of samples in the current template or the reference template may be filtered. FIG. 11 shows an example when two lines (e.g., two rows/columns) (dark dots in FIG. 11) of samples of the current template (801) are filtered according to an aspect of the disclosure. Referring to FIG. 11, the current template (801) includes the four lines L1-L4. In an example, only the two lines L2 and L3 are filtered, and other lines (L1 and L4) are not filtered.

In an aspect, referring to FIG. 7, a filter shape used in the filtering of the at least one of the current template (801) and the reference template (802) may depend on at least one of a location of the current template (801), a location of the reference template (802), a size of the current block (831), a shape of the current block (831), a size of the current template (801), a shape of the current template (801), a size of the reference template (802), a shape of the reference template (802), and the like. For example, the filter may have one of multiple shapes. The multiple shapes may include a square shape (e.g., a 3×3 filter shown in FIG. 8), a rectangular shape (e.g., a 3×2 filter, or a 2×3 filter), and the like. Which filter shape is selected may depend on coded information or known information, including but not limited to a block location relative to a picture (e.g., a block location of the reference block relative to the reference picture or a block location of the current block relative to the current picture), a block size or a block shape of the current block, a block size or a block shape of the reference block, reference (neighboring samples) lines, and/or the like. Referring to FIG. 11, for a first reference line (e.g., L1), a first filter shape may be used. For a second reference line (e.g., L2), a second filter shape may be used.

In an aspect, the filter may have different shapes if the reference template and/or the current template fall on a boundary such as a picture boundary, a slice boundary, or the like. The reference template may be on the boundary when a part of the reference template is on the boundary. The current template may be on the boundary when a part of the current template is on the boundary. For example, a first filter shape may be used when the current template falls on a boundary, and a second filter shape may be used when the current template does not fall on the boundary.

Figure 12:
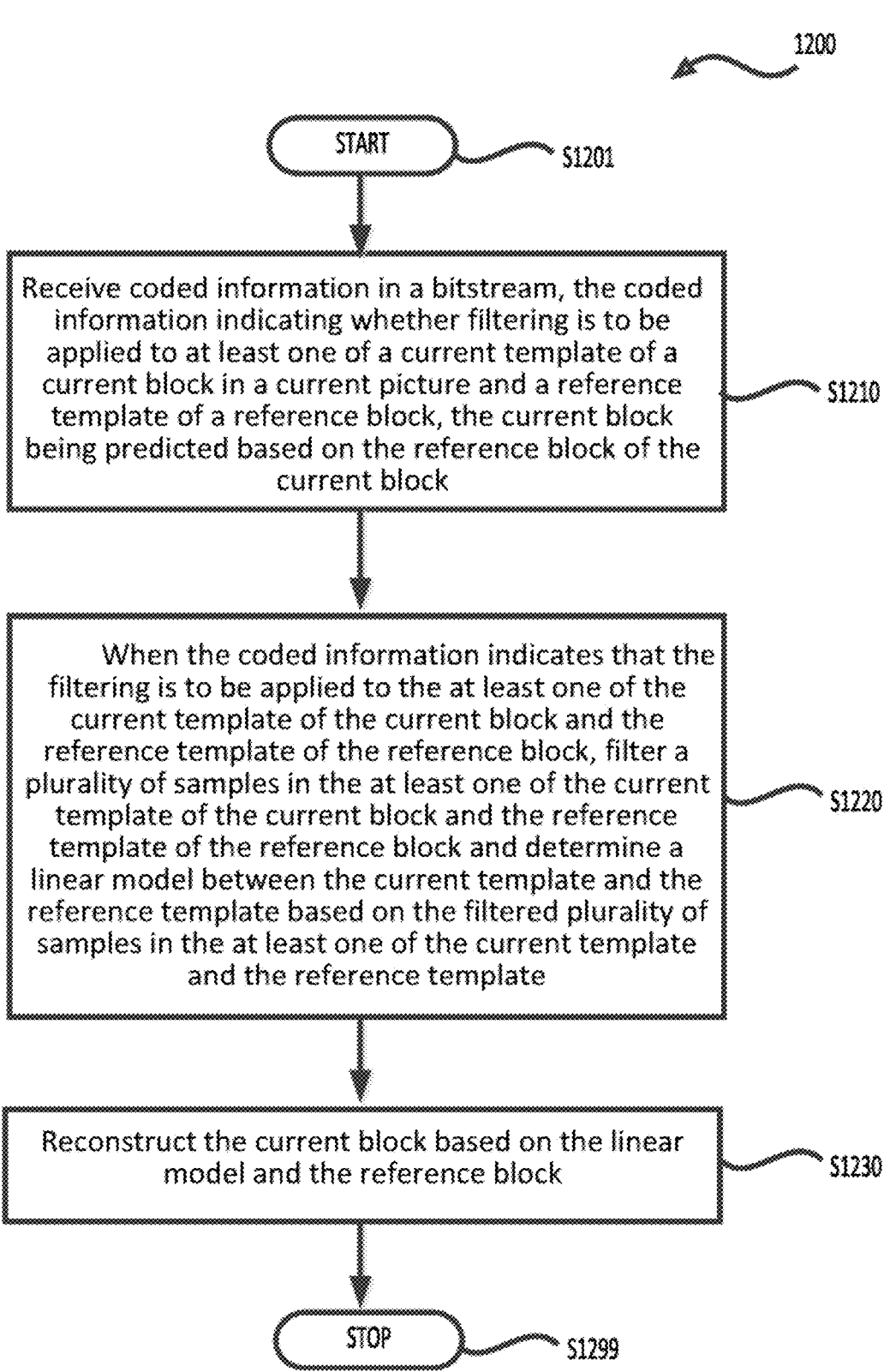
FIG. 12 shows a flow chart outlining a decoding process according to some aspects of the disclosure.

FIG. 12 shows a flow chart outlining a process (1200) according to an aspect of the disclosure. The process (1200) can be used in an apparatus, such as a video decoder. In various aspects, the process (1200) is executed by processing circuitry, such as the processing circuitry that performs functions of the video decoder (110), the processing circuitry that performs functions of the video decoder (210), and the like. In some aspects, the process (1200) is implemented in software instructions, thus when the processing circuitry executes the software instructions, the processing circuitry performs the process (1200). The process starts at (S1201) and proceeds to (S1210).

At (S1210), coded information in a bitstream is received. The coded information indicates whether filtering is to be applied to at least one of a current template of a current block in a current picture and a reference template of a reference block. The current block is predicted based on the reference block of the current block.

In an example, the coded information in the bitstream includes a flag indicating whether the filtering is to be applied to the at least one of the current template of the current block and the reference template of the reference block, and the flag is signaled at a block level or a high-level that is higher than the block level.

In an example, the current template includes neighboring reconstructed samples of the current block, and the reference template includes neighboring reconstructed samples of the reference block.

In an example, the reference block is in the current picture when the current block is predicted according to an intra template matching prediction (IntraTMP) mode.

In an example, the reference block is in a reference picture that is different from the current picture when the current block is predicted according to an inter prediction method.

In an example, the current template includes a top template that is directly above the current block, a left template that is to the left of the current block, and a top-left corner template between the top template and the left template, such as the current template (801) shown in FIG. 7.

In an example, the current template includes a top template, a left template, a top-left corner template between the top template and the left template, a top-right template that is above and to the right of the current block, and a bottom-left template that is below and to the left of the current block, such as the extended current template (901) shown in FIG. 9.

The reference template may have a same shape and a same size as the current template.

At (S1220), when the coded information indicates that the filtering is to be applied to the at least one of the current template of the current block and the reference template of the reference block, a plurality of samples in the at least one of the current template of the current block and the reference template of the reference block is filtered. A linear model between the current template and the reference template is determined based on the filtered plurality of samples in the at least one of the current template and the reference template.

In an example, the at least one of the current template and the reference template includes the current template and the reference template.

In an example, first samples of the plurality of samples in the current template of the current block are filtered with a first filter, and second samples of the plurality of samples in the reference template of the reference block are filtered with a second filter that is different from the first filter.

In an example, the at least one of the current template and the reference template consists of the current template or the reference template.

In an example, the plurality of samples in the at least one of the current template of the current block and the reference template of the reference block is filtered using a filter that is $$\begin{bmatrix} -1 & -1 & -1 \\ -1 & 10 & -1 \\ -1 & -1 & -1 \end{bmatrix}.$$

In an example, the filtering is applied to the at least one of the current template and the reference template only when the current block is a luma block.

In an example, the current block is a luma block or a chroma block.

In an example, the plurality of samples is a subset of samples in the at least one of the current template of the current block and the reference template of the reference block, such as described in FIGS. 9-11.

In an example, a filter shape used in the filtering depends on at least one of a location of the current template, a location of the reference template, a size of the current block, a shape of the current block, a size of the current template, and a shape of the current template.

At (S1230), the current block is reconstructed based on the linear model and the reference block.

In an example, the linear model is applied to the reference block to determine a prediction signal for the current block. The current block may be reconstructed based on the prediction signal. When the reference block is in the current picture, a value of a sample in the prediction signal is a weighted sum of the sample in the reference block, a plurality of neighboring samples of the sample in the reference block, and a bias term according the linear model such as described in FIGS. 6A-6B and Eqs. (1)-(2). When the reference block is in the reference picture, the value of the sample in the prediction signal is a weighted sum of the sample in the reference block and the bias term according to the linear model such as described in Eqs. (3)-(4).

Then, the process proceeds to (S1299) and terminates.

The process (1200) can be suitably adapted. Step(s) in the process (1200) can be modified and/or omitted. Additional step(s) can be added. Any suitable order of implementation can be used.

FIG. 13 shows a flow chart outlining a process (1300) according to an aspect of the disclosure. The process (1300) can be used in a video encoder. In various aspects, the process (1300) is executed by processing circuitry, such as the processing circuitry that performs functions of the video encoder (103), the processing circuitry that performs functions of the video encoder (303), and the like. In some aspects, the process (1300) is implemented in software instructions, thus when the processing circuitry executes the software instructions, the processing circuitry performs the process (1300). The process starts at (S1301) and proceeds to (S1310).

At (S1310), when filtering is to be applied to at least one of a current template of a current block in a current picture and a reference template of a reference block, a plurality of samples in the at least one of the current template of the current block and the reference template of the reference block is filtered. A linear model between the current template and the reference template is determined based on the filtered plurality of samples in the at least one of the current template and the reference template.

In an example, the reference block is in the current picture when the current block is encoded according to an intra template matching prediction (IntraTMP) mode. The reference block is in a reference picture that is different from the current picture when the current block is encoded according to an inter prediction mode. The current template includes neighboring samples of the current block. The reference template includes neighboring samples of the reference block.

In an example, the at least one of the current template and the reference template includes the current template and the reference template.

In an example, first samples of the plurality of samples in the current template of the current block are filtered with a first filter, and second samples of the plurality of samples in the reference template of the reference block are filtered with a second filter that is different from the first filter.

In an example, the at least one of the current template and the reference template consists of the current template or the reference template.

At (S1320), the current block is encoded based on the linear model and the reference block.

At (S1330), a syntax element indicating whether the filtering is to be applied to the at least one of the current template of the current block and the reference template of the reference block is encoded in a bitstream.

In an example, the syntax element is a flag indicating whether the filtering is to be applied to the at least one of the current template of the current block and the reference template of the reference block, and the flag is signaled at a block level or a high-level that is higher than the block level.

Then, the process proceeds to (S1399) and terminates.

The process (1300) can be suitably adapted. Step(s) in the process (1300) can be modified and/or omitted. Additional step(s) can be added. Any suitable order of implementation can be used.

Although the decoding and encoding processes are provided in separate flow charts for the purpose of description, it is noted that aspects of the decoding and encoding processes may be used in combination. For example, a decoding process such as described in the process (1200) may incorporate all or a portion of the process (1300). In another example, an encoding process such as described in the process (1300) may be combined with the process (1200).

In an aspect, a method of processing visual media data is disclosed. The method includes processing a bitstream of the visual media data according to a format rule. The bitstream includes a syntax element indicating whether filtering is to be applied to at least one of a current template of a current block in a current picture and a reference template of a reference block, the current block being predicted based on the reference block of the current block. The format rule specifies that: when the coded information indicates that the filtering is to be applied to the at least one of the current template of the current block and the reference template of the reference block, a plurality of samples in the at least one of the current template of the current block and the reference template of the reference block is filtered and a linear model between the current template and the reference template is determined based on the filtered plurality of samples in the at least one of the current template and the reference template. The format rule specifies that the current block is reconstructed based on the linear model and the reference block.

Aspects and/or examples in the disclosure may be used separately or combined in any order. For example, some aspects and/or examples performed by the decoder may be performed by the encoder and vice versa. Each of the methods, aspects, examples, an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 14 shows a computer system (1400) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
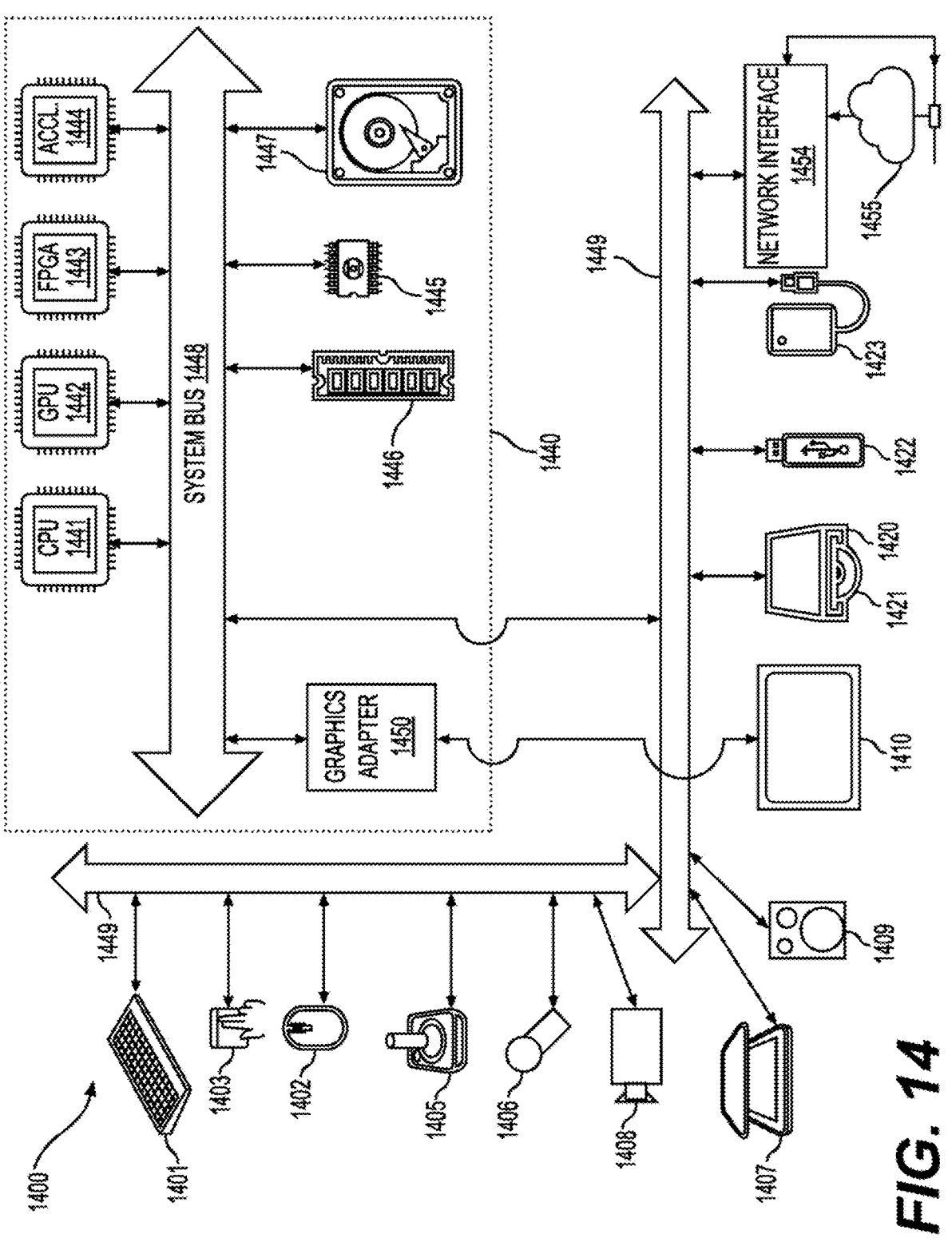
FIG. 14 is a schematic illustration of a computer system in accordance with an aspect.

The components shown in FIG. 14 for computer system (1400) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various aspects of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method for video decoding, the method including: receiving coded information in a bitstream, the coded information indicating whether filtering is to be applied to at least one of a current template of a current block in a current picture and a reference template of a reference block, the current block being predicted based on the reference block of the current block; when the coded information indicates that the filtering is to be applied to the at least one of the current template of the current block and the reference template of the reference block, filtering a plurality of samples in the at least one of the current template of the current block and the reference template of the reference block; determining a linear model between the current template and the reference template based on the filtered plurality of samples in the at least one of the current template and the reference template; and reconstructing the current block based on the linear model and the reference block.

(2) The method of feature (1), in which the reference block is in the current picture when the current block is predicted according to an intra template matching prediction (IntraTMP) mode; the reference block is in a reference picture that is different from the current picture when the current block is predicted according to an inter prediction method; the current template includes neighboring reconstructed samples of the current block; and the reference template includes neighboring reconstructed samples of the reference block.

(3) The method of feature (2), in which the reconstructing includes: applying the linear model to the reference block to determine a prediction signal for the current block; and reconstructing the current block based on the prediction signal; when the reference block is in the current picture, a value of a sample in the prediction signal is a weighted sum of the sample in the reference block, a plurality of neighboring samples of the sample in the reference block, and a bias term according the linear model; and when the reference block is in the reference picture, the value of the sample in the prediction signal is a weighted sum of the sample in the reference block and the bias term according to the linear model.

(4) The method of any of features (1) to (3), in which the at least one of the current template and the reference template includes the current template and the reference template.

(5) The method of feature (4), in which the filtering includes: filtering first samples of the plurality of samples in the current template of the current block with a first filter; and filtering second samples of the plurality of samples in the reference template of the reference block with a second filter that is different from the first filter.

(6) The method of any of features (1) to (3), in which the at least one of the current template and the reference template consists of the current template or the reference template.

(7) The method of any of features (1) to (6), in which the filtering comprises filtering the plurality of samples in the at least one of the current template of the current block and the reference template of the reference block using a filter that is $$\begin{bmatrix} -1 & -1 & -1 \\ -1 & 10 & -1 \\ 1 & -1 & -1 \end{bmatrix}.$$

(8) The method of any of features (1) to (7), in which the coded information in the bitstream includes a flag indicating whether the filtering is to be applied to the at least one of the current template of the current block and the reference template of the reference block, and the flag is signaled at a block level or a high-level that is higher than the block level.

(9) The method of any of features (1) to (8), in which the filtering is applied to the at least one of the current template and the reference template only when the current block is a luma block.

(10) The method of any of features (1) to (8), in which the current block is a luma block or a chroma block.

(11) The method of any of features (1) to (10), in which the current template comprises one of: a top template that is directly above the current block, a left template that is to the left of the current block, and a top-left corner template between the top template and the left template; and the top template, the left template, the top-left corner template between the top template and the left template, a top-right template that is above and to the right of the current block, and a bottom-left template that is below and to the left of the current block; and the reference template has a same shape and a same size as the current template.

(12) The method of any of features (1) to (11), in which the plurality of samples is a subset of samples in the at least one of the current template of the current block and the reference template of the reference block.

(13) The method of any of features (1) to (12), in which a filter shape used in the filtering depends on at least one of a location of the current template, a location of the reference template, a size of the current block, a shape of the current block, a size of the current template, and a shape of the current template.

(14) A method for video encoding, the method including: when filtering is to be applied to at least one of a current template of a current block in a current picture and a reference template of a reference block, filtering a plurality of samples in the at least one of the current template of the current block and the reference template of the reference block; determining a linear model between the current template and the reference template based on the filtered plurality of samples in the at least one of the current template and the reference template; encoding the current block based on the linear model and the reference block; and encoding, in a bitstream, a syntax element indicating whether the filtering is to be applied to the at least one of the current template of the current block and the reference template of the reference block.

(15) The method of features (14), in which the reference block is in the current picture when the current block is encoded according to an intra template matching prediction (IntraTMP) mode; the reference block is in a reference picture that is different from the current picture when the current block is encoded according to an inter prediction mode; the current template includes neighboring samples of the current block; and the reference template includes neighboring samples of the reference block.

(16) The method of any of features (14) to (15), in which the at least one of the current template and the reference template includes the current template and the reference template.

(17) The method of any of features (14) to (16), in which the filtering comprises: filtering first samples of the plurality of samples in the current template of the current block with a first filter; and filtering second samples of the plurality of samples in the reference template of the reference block with a second filter that is different from the first filter.

(18) The method of any of features (14) to (15), in which the at least one of the current template and the reference template consists of the current template or the reference template.

(19) The method of any of features (14) to (18), in which the syntax element is a flag indicating whether the filtering is to be applied to the at least one of the current template of the current block and the reference template of the reference block, and the flag is signaled at a block level or a high-level that is higher than the block level.

(20) A method of processing visual media data, the method including: processing a bitstream of the visual media data according to a format rule, wherein the bitstream includes a syntax element indicating whether filtering is to be applied to at least one of a current template of a current block in a current picture and a reference template of a reference block, the current block being predicted based on the reference block of the current block; and the format rule specifies that: when the syntax element indicates that the filtering is to be applied to the at least one of the current template of the current block and the reference template of the reference block, a plurality of samples in the at least one of the current template of the current block and the reference template of the reference block is filtered and a linear model between the current template and the reference template is determined based on the filtered plurality of samples in the at least one of the current template and the reference template; and the current block is reconstructed based on the linear model and the reference block.

(21) An apparatus for video decoding, including processing circuitry that is configured to perform the method of any of features (1) to (13).

(22) An apparatus for video encoding, including processing circuitry that is configured to perform the method of any of features (14) to (19).

(23) A non-transitory computer-readable storage medium storing instructions which when executed by at least one processor cause the at least one processor to perform the method of any of features (1) to (19).

What is claimed is:

1. A method for video decoding, the method comprising:
receiving coded information in a bitstream, the coded information indicating whether filtering is to be applied to at least one of a current template of a current block in a current picture and a reference template of a reference block, the current block being predicted based on the reference block of the current block; and
when the coded information indicates that the filtering is to be applied to the at least one of the current template of the current block and the reference template of the reference block,
filtering a plurality of samples in the at least one of the current template of the current block and the reference template of the reference block using at least one filter that includes one of a 3×3 filter, a 3×2 filter, and a 2×3 filter;
determining a linear filter between the current template and the reference template based on the filtered plurality of samples in the at least one of the current template and the reference template, the linear filter being different from the at least one filter;
applying the linear filter to the reference block to determine a prediction signal for the current block; and
reconstructing the current block based on the prediction signal.

2. The method of claim 1, wherein
the reference block is in the current picture when the current block is predicted according to an intra template matching prediction (IntraTMP) mode or an intra block copy (IBC) mode;
the reference block is in a reference picture that is different from the current picture when the current block is predicted according to an inter prediction method;
the current template includes neighboring reconstructed samples of the current block; and the reference template includes neighboring reconstructed samples of the reference block.

3. The method of claim 2, wherein
when the reference block is in the current picture, a value of a sample in the prediction signal is a weighted sum of the sample in the reference block, a plurality of neighboring samples of the sample in the reference block, and a bias term according to the linear filter; and
when the reference block is in the reference picture, the value of the sample in the prediction signal is a weighted sum of the sample in the reference block and the bias term according to the linear filter.

4. The method of claim 1, wherein the at least one of the current template and the reference template includes the current template and the reference template.

5. The method of claim 4, wherein the filtering comprises:
filtering first samples of the plurality of samples in the current template of the current block with a first filter in the at least one filter; and
filtering second samples of the plurality of samples in the reference template of the reference block with a second filter that is different from the first filter, the second filter being one of the at least one filter.

6. The method of claim 1, wherein the at least one of the current template and the reference template consists of the current template or the reference template.

7. The method of claim 1, wherein the at least one filter includes a filter that is $$\begin{bmatrix} -1 & -1 & -1 \\ -1 & 10 & -1 \\ -1 & -1 & -1 \end{bmatrix}.$$

8. The method of claim 1, wherein
the coded information in the bitstream includes a flag indicating whether the filtering is to be applied to the at least one of the current template of the current block and the reference template of the reference block, and the flag is signaled at a block level or a high-level that is higher than the block level, or
whether the filtering is to be applied to the at least one of the current template of the current block and the reference template of the reference block is determined implicitly based on already parsed information of the coded information, the already parsed information including an intra prediction mode.

9. The method of claim 1, wherein the filtering is applied to the at least one of the current template and the reference template only when the current block is a luma block.

10. The method of claim 1, wherein the current block is a luma block or a chroma block.

11. The method of claim 1, wherein
the current template comprises one of:
a top template that is directly above the current block, a left template that is to the left of the current block, and a top-left corner template between the top template and the left template; and
the top template, the left template, the top-left corner template between the top template and the left template, a top-right template that is above and to the right of the current block, and a bottom-left template that is below and to the left of the current block; and
the reference template has a same shape and a same size as the current template.

12. The method of claim 1, wherein the plurality of samples is a subset of samples in the at least one of the current template of the current block and the reference template of the reference block.

13. The method of claim 12, wherein
the current template of the current block includes a line that includes two end samples and middle samples that are between the two end samples, each middle sample is adjacent to two samples in the line, each end sample is adjacent to only one sample in the line, and
the subset of samples in the at least one of the current template of the current block and the reference template of the reference block includes the middle samples of the current template and excludes the two end samples of the current template.

14. The method of claim 12, wherein
the current template of the current block includes two end lines and one or more middle lines,
one of the two end lines is adjacent to the current block, the one or more middle lines are between the two end lines, and
the subset of samples in the at least one of the current template of the current block and the reference template of the reference block includes samples in at least one of the one or more middle lines in the current template and excludes the two end lines in the current template.

15. The method of claim 1, wherein a filter shape used in the filtering depends on at least one of a location of the current template, a location of the reference template, a size of the current block, a shape of the current block, a size of the current template, and a shape of the current template.

16. A method for video encoding, the method comprising:
when filtering is to be applied to at least one of a current template of a current block in a current picture and a reference template of a reference block,
filtering a plurality of samples in the at least one of current template of the current block and the reference template of the reference block using at least one filter that includes one of a 3×3 filter, a 3×2 filter, and a 2×3 filter;
determining a linear filter between the current template and the reference template based on the filtered plurality of samples in the at least one of the current template and the reference template, the linear filter being different from the at least one filter;
applying the linear filter to the reference block to determine a prediction signal for the current block;
encoding the current block based on the prediction signal; and
encoding, in a bitstream, a syntax element indicating whether the filtering is to be applied to the at least one of the current template of the current block and the reference template of the reference block.

17. The method of claim 16, wherein
the reference block is in the current picture when the current block is encoded according to an intra template matching prediction (IntraTMP) mode or an intra block copy (IBC) mode;
the reference block is in a reference picture that is different from the current picture when the current block is encoded according to an inter prediction mode;
the current template includes neighboring samples of the current block; and
the reference template includes neighboring samples of the reference block.

18. The method of claim 16, wherein the at least one of the current template and the reference template includes the current template and the reference template.

19. The method of claim 18, wherein the filtering comprises:

filtering first samples of the plurality of samples in the current template of the current block with a first filter in the at least one filter; and filtering second samples of the plurality of samples in the reference template of the reference block with a second filter that is different from the first filter, the second filter being one of the at least one filter.

20. A non-transitory computer-readable storage medium storing instructions which when executed by a processor cause the processor to perform an encoding method comprising:

when filtering is to be applied to at least one of a current template of a current block in a current picture and a reference template of a reference block,

36 filtering a plurality of samples in the at least one of the current template of the current block and the reference template of the reference block using at least one filter that includes one of a 3×3 filter, a 3×2 filter, and a 2×3 filter;

determining a linear filter between the current template and the reference template based on the filtered plurality of samples in the at least one of the current template and the reference template, the linear filter being different from the at least one filter;

applying the linear filter to the reference block to determine a prediction signal for the current block;

encoding the current block based on the prediction signal;

encoding, in a bitstream, a syntax element indicating whether the filtering is to be applied to the at least one of the current template of the current block and the reference template of the reference block; and transmitting the bitstream.

* * * * *